US007428345B2

(12) United States Patent
Caspi et al.

(10) Patent No.: US 7,428,345 B2

(45) Date of Patent: Sep. 23, 2008

(54) APPARATUS AND METHOD FOR SPATIO-TEMPORAL ALIGNMENT OF IMAGE SEQUENCES

(75) Inventors: Yaron Caspi, Nes Ziona (IL); Michal Irani, Rehovot (IL)

(73) Assignee: Yeda Research & Development Co. Ltd., Rehovot (IL)

( * ) Notice: Subject to any disclaimer, the term of this patent is extended or adjusted under 35 U.S.C. 154(b) by 423 days.

(21) Appl. No.: 09/852,891

(22) Filed: May 10, 2001

(65) Prior Publication Data

US 2002/0094135 A1 Jul. 18, 2002

(30) Foreign Application Priority Data

May 11, 2000 (IL) ..................................... 136080

(51) Int. Cl.
*G06K 9/32* (2006.01)
*G09G 5/00* (2006.01)
*H04N 7/00* (2006.01)

(52) U.S. Cl. .......................... 382/294; 345/351; 348/36

(58) Field of Classification Search ................. 382/236, 382/284–286, 287, 289, 294–296, 276; 345/629, 345/648–649, 651, 653, 723; 348/584, 513, 348/36; 463/31

See application file for complete search history.

(56) References Cited

U.S. PATENT DOCUMENTS 4,720,633 A 1/1988 Nelson ....................... 250/310
4,880,976 A 11/1989 Mancuso et al. ............ 250/310
5,294,978 A 3/1994 Katayama
5,412,211 A 5/1995 Knowles ..................... 250/310
5,523,786 A 6/1996 Parulski
5,789,748 A 8/1998 Liu et al. .................... 250/310
5,798,798 A 8/1998 Rector et al.
5,892,554 A 4/1999 Dicicco et al. .............. 348/584
5,920,657 A 7/1999 Bender et al.
5,982,350 A * 11/1999 Hekmatpour et al. ....... 345/629
5,987,164 A 11/1999 Szeliski et al. .............. 382/154
5,988,863 A 11/1999 Demos (Continued)

FOREIGN PATENT DOCUMENTS

EP 0 551 595 A2 7/1993
JP 2000-76423 3/2000
WO 96/15508 5/1996
WO 99/37088 7/1999

OTHER PUBLICATIONS

L. Lee, et al., "Monitoring Activities from Multiple Video Streams: Establishing a Common Coordinate Frame", IEEE Trans. on Pattern Analysis and Machine Intelligence, (Special Issue on Video Surveillance and Monitoring), 2000.

(Continued)

*Primary Examiner*—Kanjibhai Patel
(74) *Attorney, Agent, or Firm*—Ladas and Parry LLP

(57) ABSTRACT

A method and system for aligning in at least one of time and space temporally ordered sequences of images comprising receiving a plurality of sequences of images, each sequence including a multiplicity of images, each plurality of sequences defining a space-time volume, and providing an output indication relating at least one point in a space-time volume corresponding to one of the plurality of sequences to at least one point in a space-time volume corresponding to at least another one of the plurality of sequences.

19 Claims, 12 Drawing Sheets
(6 of 12 Drawing Sheet(s) Filed in Color)

U.S. PATENT DOCUMENTS

| | | | | |
|---|---|---|---|---|
| 5,999,662 | A | 12/1999 | Burt et al. | 382/284 |
| 6,075,905 | A * | 6/2000 | Herman et al. | 382/284 |
| 6,078,701 | A * | 6/2000 | Hsu et al. | 382/294 |
| 6,320,624 | B1 * | 11/2001 | Ayer et al. | 348/584 |
| 6,340,991 | B1 * | 1/2002 | Chen et al. | 348/513 |
| 6,393,163 | B1 * | 5/2002 | Burt et al. | 382/294 |
| 6,442,163 | B1 * | 8/2002 | Chopping | 370/395.1 |
| 6,447,450 | B1 * | 9/2002 | Olstad | 600/437 |
| 6,459,482 | B1 | 10/2002 | Singh et al. | 356/243.1 |
| 6,482,090 | B1 * | 11/2002 | Rimoto et al. | 463/31 |
| 6,714,216 | B2 * | 3/2004 | Abe | 345/723 |

OTHER PUBLICATIONS

I. Reid and Zisserman, "Goal-Directed Video Metrology", European Conference on Computer Vision, pp. 647-658, 1996.

G.P.Stein, "Tracking from Multiple View Points: Self-Calibration of Space and Time", DARPA IU Workshop, pp. 1037-1042, 1998.

R. Szeliski, et al., "Creating Full View Panoramic Image Mosaics and Environments Maps", Computer Graphics Proceedings, Annual Conference Series, 8, 1997.

P.H.S. Torr, et al., "Feature Based Methods for Structure and Motion Estimation", Vision Algorithms Workshop, pp. 279-290, Corfu, 1999.

M. Irani, et al., "Robust Multi-Sensor Image Alignment", IEEE International Conference on Computer Vision (ICCV), India, Jan. 1998.

W.E.L. Grimson, et al., "Forest of Sensors: Using Adaptive Tracking to Classify and Monitor Activities in a Site", DARPA ONR Workshop, pp. 33-41, 1998.

M. Irani, et al., "Recovery of Ego-Motion Using Region Alignment", IEEE Trans. on Pattern Analysis and Machine Intelligence, 19(3), Mar. 1997, pp. 268-272.

M. Irani, et al., "Computing Occluding and Transparent Motions", International Journal of Computer Vision, vol. 12, Feb. 1994, pp. 5-16.

H. Sawhney, et al., "True Multi-Image Alignment and Its Application to Mosaicing and Lens Distortion Correction", IEEE Conference on Computer Vision and Pattern Recognition, 1997, pp. 450-456.

J.R. Bergen, et al., "Hierarchical Model-Based Motion Estimation", European Conference on Computer Vision, pp. 237-252, 1992.

M.A. Giese, et al., "Synthesis and Recognition of Biological Motion Patterns on Linear Superposition Prototypical Motion Sequences", International Conference on Computer Vision, pp. 73-80, 1998.

E. Grimson, et al., "A Forest of Sensors", International Conference on Computer Vision, pp. 45-51, 1997.

M. Irani, et al., "About Direct Methods", Vision Algorithms Workshop, pp. 267-277, Corfu, 1999.

J. R. Bergen, P. Anandan, K. J. Hanna, and R. Hingorani. Hierarchical model-based motion estimation. In European Conference on Computer Vision, pp. 237-252, 1992.

J. R. Bergen, P.J. Burt, R. Hingorani, and S. Peleg. A three frame algorithm for estimating two-component image motion. IEEE Trans. on Pattern Analysis and Machine Intelligence, 14:886-896, Sep. 1992.

P. J. Burt and E. H. Adelson The laplacian pyramid as a compact image code. IEEE Transcations on Communication, 31:532-540,1983.

Olivier Faugeras. Three-Dimensional Computer Vision--A Geometric Viewpoint MIT Press, Cambridge, Mass., 1996.

M. A. Fischler and R. C. Bolles. Ransac random sample concensus: a paradigm for model fitting with applications to image analysis and automated cartography, In Communications of the ACM, vol. 26, 1981.

F. R. Hampel, P. J. Rousseeuw, and and W. A. Stahel E. Ronchetti. Robust Statistics: The Approach Based on Influence Functions. John Wiley, New York, 1986. A Book.

K. Hanna. Direct multi-resolution estimation of ego-motion and structure from motion. In IEEE Workshop ob Visual Motion, pp. 156-162, Princeton, N.J.,.

C. G. Harris and M. Stephens. A combined corner and edge detector. In 4th Alvey Vision Conference, 1988.

B. K. P. Horn and B. G. Schunck. Determining optical flow. Artificial Intelligence, 17:185-203, 1981.

M. Irani and P. Anandan. Parrallax geometry of pairs of points for 3d scence analysis. In European Conference on Computer Vision, Cambridge, UK, Apr. 1996.

M. Irani, B. Rousso, and S. Peleg. Detecting and tracking multiple moving objects using temporal integration. In European Conference on Computer Vision, pp. 282-287, Santa Margarita Ligure, may 1992.

M. Irani, P. Anandan, J. Bergen, R. Kumar, and S. Hsu, Efficient Representation of Video Sequences and Their Applications. Signal Processing: Image Communication, special issue on Image and Video Semantics: Processing, Analysis, and Application, vol. 8, No. 4, May 1996.

Paul Viola and William M. Wells III, "Alignment by maximization of mutual infromation," International Journal of Computer Vision (LJCV),24(2): 137-154, 1997.

Y. Caspi and M. Irani. A step towards sequence-to-sequence alignment. In IEEE Conference on Computer Vision and Pattern Recognition, Hilton Head Island, S.C., Jun. 2000.

R. Kumar, P. Anandan, and K. Hanna. Direct recovery of shape from multiple views: a parallax based approach. In Proc 12th ICPR, pp. 685-688, 1994.

Harpreet Sawhney. 3d geometry from planar parallax. In IEEE Conference on Computer Vision and Pattern Recognition, Jun. 1994.

Z. Zhang, R. Deriche, O. Faugeras, and Q. Luong. A robust technique for matching two uncalibrated images through the recovery of the unknown epipolar geometry. Artificial Intelligence, 78:87-119, 1995.

Pissinou, N., et al., "A Topological-Directional Model for the Spatio-Temporal Composition of Video Objects", *IEEE*, Feb. 1998, pp. 17-24.

Tsai, R.Y., et al., "A New Technique for Full Autonomous and Efficient 3D Robotics Hand/Eye Calibration", *IEEE Journal of Robotics and Automation*, Jun. 1989, pp. 345-358.

Zisserman, A, et al., "Metric Calibration of A Stereo Rig", *Workshop on Representations of Visual Scenes*, 1995, pp. 93-100.

Irani, M., et al., "From Reference Frames to Reference Planes: Multi-View Parallax Geometry and Applications", *European Conference on Computer Vision, Freiburg*, Jun. 1998, 15 pages.

Shashua, A., et al, "Relative Affine Structure: Theory and Application to 3D Reconstruction from Perspective Views", *IEEE Conference on Computer Vision and Pattern Recognition, Seattle WA*, Jun. 1994, pp. 483-489.

Hartley, R. I., "In Defence of the 8-point Algorithm", *In Pattern Recognition and Machine Intelligence* 19, Jun. 6, 1997, pp. 580-593.

Horaud, R., et al., "Hand-Eye Calibration", *International Journal of Robotics Research* 14(3), Jun. 1995, pp. 195-210 (reprinted 1-28).

Avidan, S., et al., "Threading Fundamental Matrices", *In European conference on Computer Vision*, 1998, pp. 1-10.

Beardsley, P., et al, "3D Model Acquisition from Extended Image Sequences", *In proc 4th European Conference on Computer Vision, LNCS* 1065, *Cambridge*, 1996, pp. 683-695.

Burt, P.J., et al.,"Enhanced Image Capture Through Fusion", *In International Conference on Computer Vision*, 1993, pp. 173-182.

Demirdjian, D. et al., "Stereo Autocalibration From One Plane", *In European Conference on Computer Vision*, 2000. 15 pages.

Dufournaud, Y., et al., "Matching Images with Different Resolutions", *In IEEE Conference on Computer Vison and Pattern Recognition, Hilton Head Island, South Carolina*, Jun. 2000, pp. 612-618.

Haraud, R., et al., "Self-Calibration and Euclidean Reconstruction using Motions of a Stereo Rig", *In International Conference on Computer Vision*, 1998, pp. 96-103.

Gantmakher, F.R., "Matrix Equations", *Chapter VIII, Chelsea Pub NY*, 1959, pp. 215-220.

Golub, G., et al., "3.5 Imrpoving and Estimating Accuracy," *Matrix Computations, The John Hopkins University Press, Baltimore and London*, 1989, pp. 123-127.

Hartley, R., et al., "Estimation - 2D Projective Transformations", *Multiple View Geometry In Computer Vision*, Cambridge University Press, Cambridge, 2000, pp. 69-116.

Esp@cenet english Abstract of JP2000076423 dated Mar. 14, 2000.

* cited by examiner

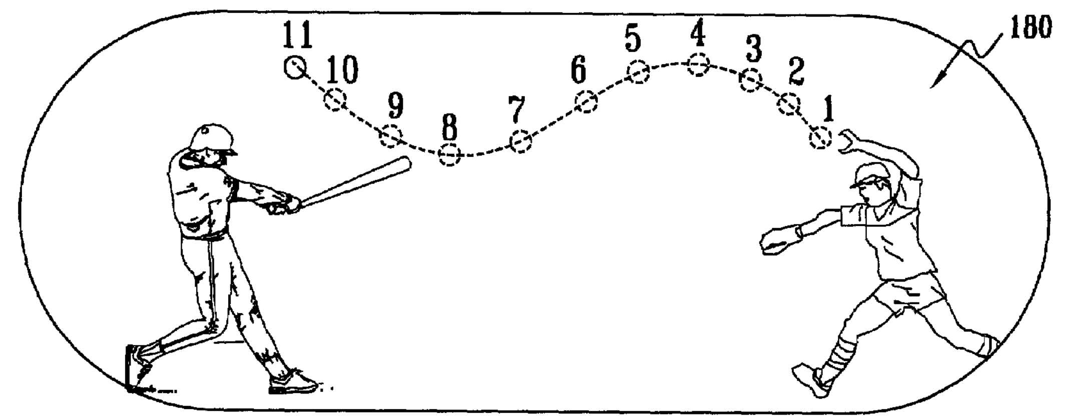
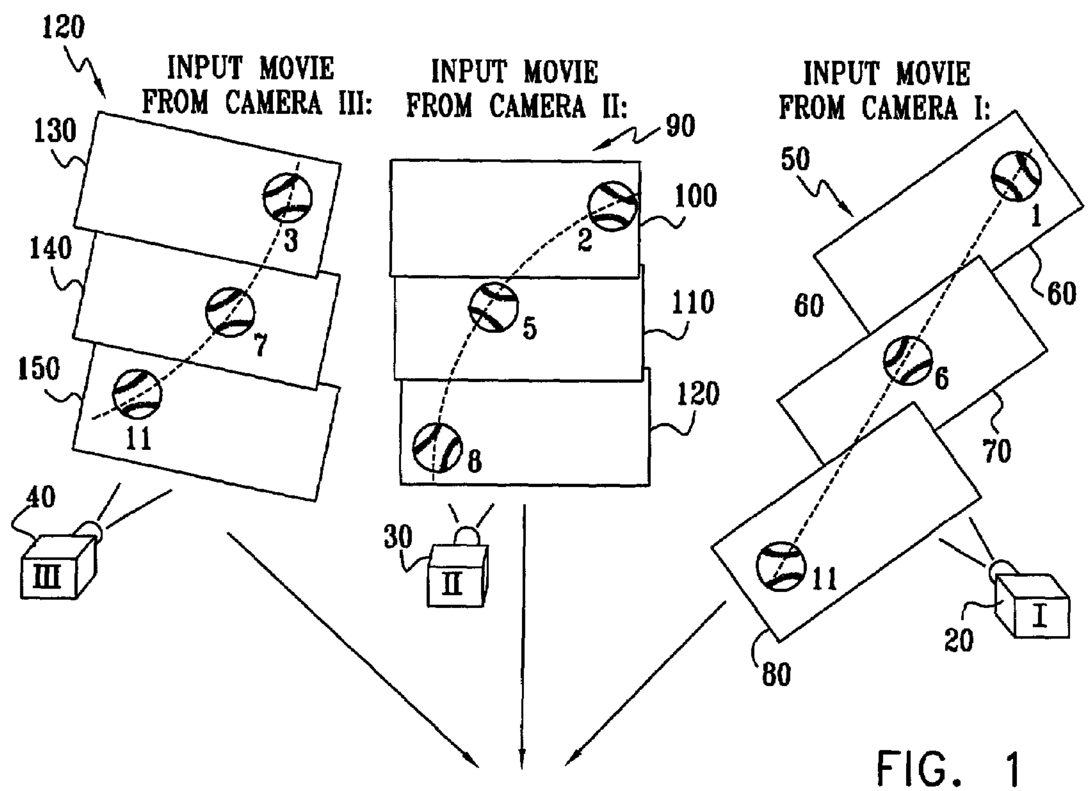
FIG. 1
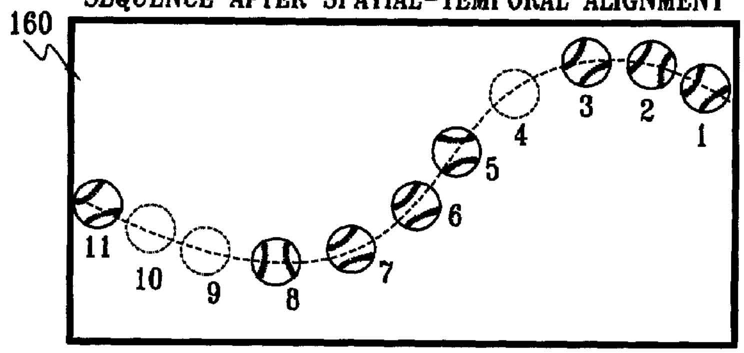

INITIAL P=P0 (USUALLY IDENTITY)
SEQUENCE WARPING
SPATIO TEMPORAL ESTIMATION
P
P
||ΔP||< ε
PROPAGATE P TO NEXT LEVEL
SECOND SEQUENCE
REFERENCE SEQUENCE
S3
S2
S1
S0
S'3
S'2
S'1
S'0

FIG. 7A
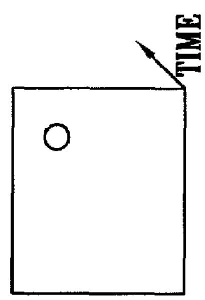
FIG. 7B
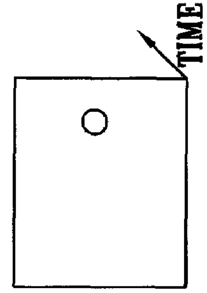
FIG. 7C
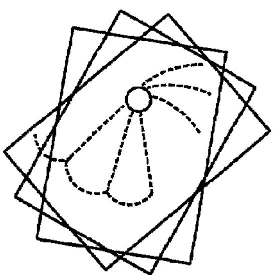
FIG. 7D
FRAME 20
FRAME 10
FRAME 1
TIME
FIG. 7E
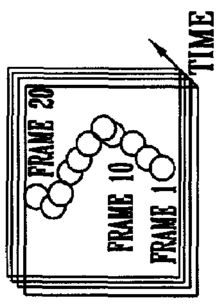
FIG. 8A
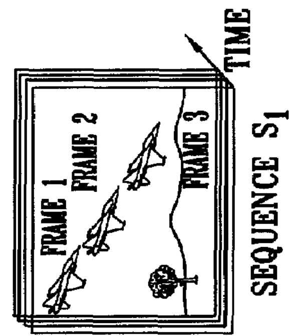
SEQUENCE $S_1$
FIG. 8B
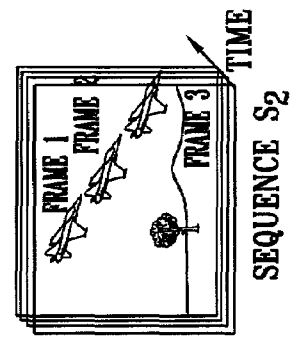
SEQUENCE $S_2$
FIG. 8C
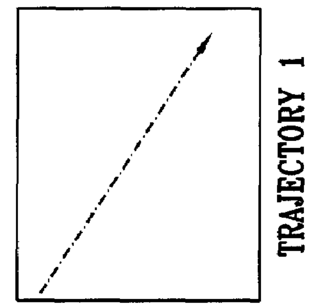
TRAJECTORY 1
FIG. 8D
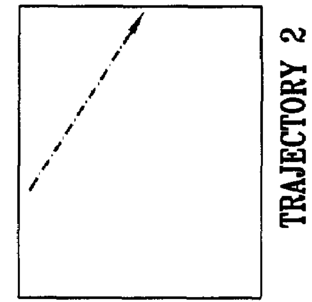
TRAJECTORY 2

APPARATUS AND METHOD FOR SPATIO-TEMPORAL ALIGNMENT OF IMAGE SEQUENCES

Computer program listing appendices are submitted herewith on one compact disc and one duplicate compact disc. The total number of compact discs including duplicates is two. The files on the compact disc are text files in hexadecimal format. Their names, dates of creation, directory locations, and sizes in bytes are:

"Method" directory containing file seq2seq.hex of May 3, 2001 and of length 291,460 bytes.

"Movie" directory containing file movie.hex of May 3, 2001 and of length 9,706,798 bytes.

The material on the compact discs is incorporated by reference herein.

FIELD OF THE INVENTION

The present invention relates to apparatus and methods for sequence-to-sequence alignment.

BACKGROUND OF THE INVENTION

State of the art methods for sequence-to-sequence alignment, and other relevant technologies, are described in:

[1] J. R. Bergen, P. Anandan, K. J. Hanna, and R. Hingorani. Hierarchical model-based motion estimation. In European Conference on Computer Vision, pages 237–252, 1992.

[2] J. R. Bergen, P. J. Burt, R. Hingorani, and S. Peleg. A three frame algorithm for estimating two-component image motion. IEEE Trans. on Pattern Analysis and Machine Intelligence, 14:886–896, September 1992.

[3] P. J. Burt and E. H. Adelson The laplacian pyramid as a compact image code. IEEE Transactions on Communication, 31:532–540, 1983.

[4] Y. Caspi and M. Irani. A step towards sequence-to-sequence alignment. In IEEE Conference on Computer Vision and Pattern Recognition, Hilton Head Island, S.C., June 2000.

[5] Olivier Faugeras. Three-Dimensional Computer Vision—A Geometric Viewpoint. MIT Press, Cambridge, Mass., 1996.

[6] M. A. Fischler and R. C. Bolles. Ransac random sample concensus: a paradigm for model fitting with applications to image analysis and automated cartography. In Communications of the ACM, volume 26, 1981.

[7] F. R. Hampel, P. J. Rousseeuw, and and W. A. Stahel E. Ronchetti. Robust Statistics:The Approach Based on Influence Functions. John Wiley, New York, 1986.

[8] M. A. Giese and T. Poggio. Synthesis and recognition of biological motion patterns on linear superposition prototypical motion sequences. In International Conference on Computer Vision, pages 73–80, 1998.

[9] E. Grimson, P. Viola, O.Faugeras, T. Lozano-Perez, T. Poggio, and S. Teller. A forest of sensors. In International Conference on Computer Vision, pages 45–51, 1997.

[10] K. Hanna. Direct multi-resolution estimation of ego-motion and structure from motion. In IEEE Workshop on Visual Motion, pages 156–162, Princeton, N.J., October 1991.

[11] C. G. Harris and M. Stephens. A combined corner and edge detector. In 4th Alvey Vision Conference, 1988.

[12] B. K. P. Horn and B. G. Schunck. Determining optical flow. Artificial Intelligence, 17:185–203, 1981.

[13] M. Irani and P. Anandan. Parallax geometry of pairs of points for 3d scene analysis. In European Conference on Computer Vision, Cambridge, UK, April 1996.

[14] M. Irani and P. Anandan. About direct methods. In Vision Algorithms Workshop, pages 267–277, Corfu, 1999.

[15] M. Irani, B. Rousso, and P. peleg. Recovery of ego-motion using region alignment. IEEE Trans. on Pattern Analysis and Machine Intelligence, 19(3):268–272, March 1997.

[16] M. Irani, B. Rousso, and S. Peleg. Detecting and tracking multiple moving objects using temporal integration. In European Conference on Computer Vision, pages 282–287, Santa Margarita Ligure, May 1992.

[17] M. Irani, B. Rousso, and S. Peleg. Computing occluding and transparent motions. International Journal of Computer Vision, 12:5–16, February 1994.

[18] R. Kumar, P . Anandan, and K. Hanna. Direct recovery of shape from multiple views: a parallax based approach. In Proc 12th ICPR, pages 685–688, 1994.

[19] L. Lee R., Romano, and G. Stein. Monitoring activities from multiple video streams: Establishing a common coordinate frame, to appear in. IEEE Trans. on Pattern Analysis and Machine Intelligence, (Special Issue on Video Surveillance and Monitoring), 2000.

[20] I. Reid and A. Zisserman. Goal-directed video metrology. In European Conference on Computer Vision, pages 647–658, 1996.

[21] H. Sawhney and R. Kumar. True multi-image alignment and its application to mosaicing and lens distortion correction. In IEEE Conference on Computer Vision and Pattern Recognition, pages 450–456, 1997.

[22] Harpreet Sawhney. 3d geometry from planar parallax. In IEEE Conference on Computer Vision and Pattern Recognition, June 1994.

[23] G. P. Stein. Tracking from multiple view points: Self-calibration of space and time. In DARPA IU Workshop, pages 1037–1042, 1998.

[24] R. Szeliski and H.-Y Shum. Creating full view panoramic image mosaics and environments maps. In Computer Graphics Proceedings, Annual Conference Series, 8 1997.

[25] P. H. S. Torr and A. Zisserman. Feature based methods for structure and motion estimation. In Vision Algorithms Workshop, pages 279–290, Corfu, 1999.

[26] Z. Zhang, R. Deriche, O. Faugeras, and Q. Luong. A robust technique for matching two uncalibrated images through the recovery of the unknown epipolar geometry. Artificial Intelligence, 78:87–119, 1995.

[27] M. Irani, P. Anandan, J. Bergen, R. Kumar, and S. Hsu, Efficient Representations of Video Sequences and Their Applications. Signal Processing: Image Communication, special issue on Image and Video Semantics: Processing, Analysis, and Application, Vol. 8, No. 4, May 1996.

[28] M. Irani and P. Anandan, *Robust Multi-Sensor Image Alignment*. IEEE International Conference on Computer Vision (ICCV), India, January 1998.

[29] Paul Viola and William M. Wells III, "*Alignment by maximization of mutual information*," International Journal of Computer Vision (IJCV), 24(2): 137–154, 1997.

The disclosures of all publications mentioned in the specification and of the publications cited therein are hereby incorporated by reference.

SUMMARY OF THE INVENTION

The present invention seeks to provide apparatus and methods for providing parametric spatial-temporal alignment between image sequences.

There is thus provided in accordance with a preferred embodiment of the present invention a method for aligning in at least one of time and space temporally ordered sequences of images including receiving a plurality of sequences of images, each sequence containing a multiplicity of images, each of the plurality of sequences defining a space-time volume and providing an output indication relating at least one point in a space-time volume corresponding to one of the plurality of sequences to at least one point in a space-time volume corresponding to at least another one of the plurality of sequences.

Further in accordance with a preferred embodiment of the present invention, providing an output indication includes finding at least one global alignment in at least one of time and space between at least a portion of a first space-time volume corresponding to one of the plurality of sequences and at least a portion of a second space-time volume corresponding to at least another one of the plurality of sequences, wherein the at least one global alignment matches spatial-temporal variations occurring at plural locations in the first space-time volume to spatial-temporal variations occurring at plural locations in the second space-time volume.

Still further in accordance with a preferred embodiment of the present invention, providing an output indication includes finding at least one global alignment in at least one of time and space between at least a portion of a first space-time volume corresponding to one of the plurality of sequences and at least a portion of a second space-time volume corresponding to at least another one of the plurality of sequences, wherein the at least one global alignment correlates spatial-temporal variations occurring at plural locations in the first space-time volume to spatial-temporal variations occurring at plural locations in the second space-time volume.

Additionally in accordance with a preferred embodiment of the present invention, providing an output indication includes finding at least one global alignment in at least one of time and space between at least a portion of a first space-time volume corresponding to one of the plurality of sequences and at least a portion of a second space-time volume corresponding to at least another one of the plurality of sequences, wherein the at least one global alignment matches at least temporal variations occurring at plural locations in the first space-time volume to at least temporal variations occurring at plural locations in the second space-time volume.

Still further in accordance with a preferred embodiment of the present invention, providing an output indication includes finding at least one global alignment in at least one of time and space between at least a portion of a first space-time volume corresponding to one of the plurality of sequences and at least a portion of a second space-time volume corresponding to at least another one of the plurality of sequences, wherein the at least one global alignment correlates at least temporal variations occurring at plural locations in the first space-time volume to at least temporal variations occurring at plural locations in the second space-time volume.

Further in accordance with a preferred embodiment of the present invention, the step of finding at least one global alignment in at least one of time and space includes finding at least one global alignment in time.

Additionally in accordance with a preferred embodiment of the present invention, the step of finding at least one global alignment in at least one of time and space includes finding at least one global alignment in space.

Also provided, in accordance with another preferred embodiment of the present invention, is a system for aligning in at least one of time and space temporally ordered sequences of images including a space-time volume generator, receiving a plurality of sequences of images, each sequence containing a multiplicity of images, each of the plurality of sequences defining a space-time volume and an aligner, providing an output indication relating at least one point in a space-time volume corresponding to one of the plurality of sequences to at least one point in a space-time volume corresponding to at least another one of the plurality of sequences.

Further in accordance with another preferred embodiment of the present invention, the aligner includes a match-based global alignment finder, finding at least one global alignment in at least one of time and space between at least a portion of a first space-time volume corresponding to one of the plurality of sequences and at least a portion of a second space-time volume corresponding to at least another one of the plurality of sequences, wherein at least one global alignment matches spatial-temporal variations occurring at plural locations in the first space-time volume to spatial-temporal variations occurring at plural locations in the second space-time volume.

Still further in accordance with a preferred embodiment of the present invention, the aligner includes a correlation-based global alignment finder, finding at least one global alignment in at least one of time and space between at least a portion of a first space-time volume corresponding to one of the plurality of sequences and at least a portion of a second space-time volume corresponding to at least another one of the plurality of sequences, wherein at least one global alignment correlates spatial-temporal variations occurring at plural locations in the first space-time volume to spatial-temporal variations occurring at plural locations in the second space-time volume.

Further in accordance with a preferred embodiment of the present invention, the aligner includes a match-based global alignment finder, finding at least one global alignment in at least one of time and space between at least a portion of a first space-time volume corresponding to one of the plurality of sequences and at least a portion of a second space-time volume corresponding to at least another one of the plurality of sequences, wherein the at least one global alignment matches at least temporal variations occurring at plural locations in the first space-time volume to spatial-temporal variations occurring at plural locations in the second space-time volume.

Still further in accordance with a preferred embodiment of the present invention, the aligner includes a correlation-based global alignment finder, finding at least one global alignment in at least one of time and space between at least a portion of a first space-time volume corresponding to one of the plurality of sequences and at least a portion of a second space-time volume corresponding to at least another one of the plurality of sequences, wherein the at least one global alignment correlates at least temporal variations occurring at plural locations in the first space-time volume to spatial-temporal variations occurring at plural locations in the second space-time volume.

Numerals in square brackets, in the following paragraphs, refer to the publications listed in the Background of the Invention section.

This invention comprises a method for establishing correspondences in time and in space between two different video/image sequences of the same dynamic scene, The method simultaneously estimates spatial alignment and temporal alignment between the two sequences, using available spatio-temporal information. Temporal variations between image frames (such as moving objects or changes in scene illumination) are powerful cues for alignment, which cannot be exploited by standard image-to-image alignment techniques. By folding spatial and temporal cues into a single alignment framework, situations which are inherently ambiguous for traditional image-to-image alignment methods, are often uniquely resolved by sequence-to-sequence alignment. The problem of image-to-image alignment has been extensively studied in the literature. "image-to-image alignment" refers to the problem of densely estimating point correspondences between two or more images (either taken by a single moving camera, or by multiple cameras), i.e., for each pixel (x, y) in one image, find its corresponding pixel in the other image: (x', y')=(x+u, y+v), where (u, v) is the spatial displacement. This invention addresses a different problem the problem of "sequence-to-sequence alignment", which establishes correspondences both in time and in space between multiple sequences (as opposed to multiple images). Namely, for each pixel (x, y) in each frame (time) t in one sequence, find its corresponding frame t' and pixel (x', y') in the other sequence: (x', y', t')=(x+u, y+v, t+w), where (u, v, w) is the spatio-temporal displacement. In many real-world scenarios, multiple video cameras record information about the same scene over a period of time. Some examples are: News items commonly documented by several media crews; sports events covered by at least a dozen cameras recording the same scene from different view points. Alignment of information across multiple sequences is beneficial for a wide variety of dynamic scene applications, including dynamic scene analysis, wide area surveillance, multi-sensor collaboration, constructing common scene-based representations, (i.e., multi-sequences mosaics), multi-sequence compression, multi-sensor fusion, sequence enhancement, and more.

Conventional image-to-image alignment methods are inherently restricted to the information contained in individual images, i.e., the spatial variations within the image (which corresponds to scene appearance). But there are cases when there is not enough spatial information within the images to allow reliable image alignment (e.g., see FIGS. 7A-7B). However, a video sequence contains much more information than any individual frame does. In particular, information about scene dynamics (such as moving object, changes in illumination, etc.) is a property that is inherent to the scene, and is thus common to all sequences taken from different imaging devices. It therefore forms an additional powerful cue for alignment.

It may be useful to extend image-to-image techniques into sequence-to-sequence techniques. A gradient based method is described that addresses the problem of sequence-to-sequence alignment. The particular method is a generalization of a direct image alignment method. In this particular example it may be assumed that the sequences are taken by stationary video cameras, with fixed (but unknown) internal and external parameters. Our method simultaneously estimates spatial and temporal alignment parameters without requiring prior estimation of point correspondences, frame correspondences, moving object detection, or detection of illumination variations.

The scenario addressed, by way of example, is when the video cameras are stationary, with fixed (but unknown) internal and external parameters. The recorded scene can change dynamically, i.e., it can include moving objects, changes in illumination over time, and/or other type of temporal changes. Temporal misalignment can result from the fact that the two input sequences can be at different frame rates (e.g., PAL and NTSC), or may have a time-shift (offset) between them (e.g., if the cameras were not activated simultaneously). The temporal shift may be at sub-frame units. These types of temporal misalignment can be modeled by a 1-D affine transformation in time. Spatial misalignment results from the fact that the two cameras are in different positions and have different internal calibration parameters. These can range from 2D parameteric transformations to more general 3D transformations.

An image sequence is handled as a volume of three dimensional data (x, y, t) and not as a set of two-dimensional images $\{x, y\}_{t=1}^{N}$ However, unlike standard 3D volumetric alignment the spatial (x, y) and the temporal (t) components have different behavior. Typically they are treated separately, and cannot be inter-mixed.

Sequence-to-Sequence vs. Image-to-Image Alignment

Sequence-to-sequence alignment can be equally applied to any other alignment methods. Hence the objective of discussion here will be the paradigm of sequence-to-sequence alignment and not just the particular method described herein. Sequence-to-sequence alignment is a generalization of image-to-image alignment. We discuss this generalization in the context of two common alignment approaches: (i) Direct methods and (ii) Feature-Based methods. Furthermore, we show that ambiguities in alignment that can result from using spatial information alone or temporal information alone can be resolved by sequence-to-sequence alignment paradigm. This is shown for both direct and feature-based sequence-to-sequence alignment.

Direct Sequence-to-Sequence Alignment

In the direct method, if there are no temporal changes in the scene, then the temporal derivatives within the sequence are zero: $S_t \equiv 0$. Therefore, for any space-time point (x, y, t), the error term of Eq. (1) presented below reduces to:

$$\underbrace{err_{seq}(x, y, t; \vec{P})}_{seq-to-seq} = S' - S + [u, v]\begin{bmatrix} S_x \\ S_y \end{bmatrix} = I' - I + [u, v]\begin{bmatrix} I_x \\ I_y \end{bmatrix} = \underbrace{err_{img}(x, y; \vec{P})}_{img-to-img}$$

Where, I(x, y)=S(x, y, t) is the image frame at time t. Therefore, the SSD function of Eq. (1) presented below reduces to the image-to-image alignment objective function, averaged over all frames.

When the scene does contain temporal variations, sequence-to-sequence alignment uses more information for spatial alignment than image-to-image alignment has access to. In particular, there are ambiguous scenarios for image-to-image alignment, which sequence- to-sequence alignment can uniquely resolve. FIGS. 7A-7E illustrate a case which is ambiguous for image-to-image alignment. Consider a uniform background scene with a moving ball (FIG. 7A and FIG. 7B). At any given frame all the spatial gradients are concentrated in a very small image region (the moving ball). In these cases, image-to-image alignment cannot uniquely determine the correct spatial transformation (FIG. 7C). Sequence- to-sequence alignment, on the other hand, does not suffer from spatial ambiguities in this case, as the spatial transformation typically simultaneously brings into alignment all corresponding frames across the two sequences, i.e., the two trajectories (depicted in FIG. 7C and FIG. 7D) are typically in alignment. Furthermore, sequence-to-sequence alignment is more powerful then using all the spatial constraints from all pairs of images to solve for spatial transformation as: (i) it recovers also the temporal misalignment (at sub-frame accuracy) and (ii) it obtains a more accurate spatial alignment as image-to-image alignment can access only frames in the two sequence-to-sequences, but these may not be exactly corresponding frames in time, due to sub-frame temporal misalignment between the two sequences.

Feature-Based Sequence-to-Sequence Alignment

The sequence-to-sequence paradigm is not limited only to direct methods, but can equally be implemented using feature-based methods. Feature-based methods first apply a local operator to detect singularity points on an image (e.g., Harris corner detector)[11]. Once two sets of singularity points are extracted, robust estimation methods such as RANSAC[6], LMS[7], etc. are used for finding corresponding points, and extracting the alignment parameters.

To address sequences instead of images, we extend the mining of a feature from feature point into feature trajectory. That is a trajectory of points representing its location on each frame within each sequence. Thus the second step will find correspondences between trajectories of points (the features x,y coordinates along the sequence). Note that in sequence-to-sequence alignment these trajectories do not necessarily belong to a moving object, but may include prominent features which belong to a static object. This will produce a constant trajectory that is valid in any sense.

Feature based sequence-to-sequence alignment is a generalization of feature-based image-to-image alignment. If we consider a scene without moving objects, all trajectories will become trajectories of static objects, and the input is similar, thus the latter becomes identical to the first.

On the other hand the disadvantages of choosing only features of moving object is the possible ambiguities in alignment. This is illustrated in FIGS. 8A–8D. When only the moving object information is considered (i.e., the trajectory of the airplane), then for any temporal shift, there exists a consistent spatial transformation between the two sequences, which will bring the two trajectories in FIGS. 8C and 8D into alignment. Namely, in this scenario, moving object alignment (trajectory-to-trajectory alignment) may find infinitely many valid spatio-temporal transformations. Sequence-to-sequence alignment should use both static and dynamic information and will there-fore uniquely resolve the ambiguity in this case, as it forces both spatial and temporal information to be brought simultaneously into alignment across the two sequences.

Pros and cons of feature-based versus direct-based methods of image-to-image alignment apply also here, e.g., it is simpler to extended the feature based approach to extract fundamental matrix across two sequences.

The above suggested approach to feature-based sequence-to-sequence alignment can only exploit dynamic changes which are due to moving objects. However, other temporal changes, such as changes in illumination, or changes that effects the features themselves (e.g., highly non rigid motion) can not be captured by by this feature-based sequence-to-sequence. The direct sequence-to-sequence alignment on the other hand captures any type of dynamic changes via the temporal derivatives, without explicitly modeling these changes by features. Therefore, it can handle quite complex dynamic, as is shown in the examples of FIGS. 10–16. In particular, dimming or brightening of the light source are often sufficient to determine the temporal alignment. Furthermore, even homogeneous image regions contribute temporal constraints in this case. This is true although their spatial derivatives are zero, since global changes in illumination produce prominent temporal derivatives.

Note that, in general, changes in illumination need not be global. For example, an outdoor scene on a partly cloudy day, or an indoor scene with spot-lights, can be exposed to local changes in illumination. Such local changes provide additional constraints on the spatial alignment parameters. An example of applying our method to sequences with only changes in illumination is shown in lines (a)–(d) of FIG. 12.

The paradigm of sequence-to-sequence alignment extends beyond any particular method. It can equally apply to feature-based matching across sequences, or other types of match measures (e.g., mutual information).

BRIEF DESCRIPTION OF THE DRAWINGS AND APPENDICES

The patent or application file contains at least one drawing executed in color. Copies of this patent or patent application publication with color drawing(s) will be provided by the Office upon request and payment of the necessary fee.

The present invention will be understood and appreciated from the following detailed description, taken in conjunction with the drawings and appendices in which:

FIG. 1 is a simplified block diagram of an event, several image sequences of the event captured from differently oriented cameras and therefore each generating different and misleading perceptions of the ball trajectory, and finally, the perceived ball trajectory of a temporally refined combined sequence generated in accordance with a preferred embodiment of the present invention by spatially-temporally aligning, and combining, the various image sequences of the event;

FIGS. 7A and 7B are pictorial illustrations of corresponding frames from two unaligned sequences;

FIG. 7C is a pictorial illustration of some possible alignments between the frames of FIGS. 7A and 7B;

FIGS. 7D and 7E are pictorial illustrations of two sequences of the moving ball appearing in the frames of FIGS. 7A–7B, only one of which aligns the two trajectories of the ball.

FIG. 8A is a scene of an airplane, as viewed by a first camera;

FIG. 8B is the scene of the airplane of FIG. 8A as viewed by a second camera;

FIG. 8C is the trajectory of the airplane as seen by the first camera;

FIG. 8D is the trajectory of the airplane as seen by the second camera;

Also attached herewith is a CD-ROM appendix which aids in the understanding and appreciation of one preferred embodiment of the invention shown and described herein.

DETAILED DESCRIPTION OF PREFERRED EMBODIMENTS

FIG. 1 is a simplified block diagram of an event, several image sequences of the event captured from differently oriented unsynchronized cameras and therefore each generating different perceptions of the ball trajectory, and finally, the perceived ball trajectory of a combined sequence with improved temporal resolution generated in accordance with a preferred embodiment of the present invention by spatially-temporally aligning, and combining, the various image sequences of the event.

Figure 2A:
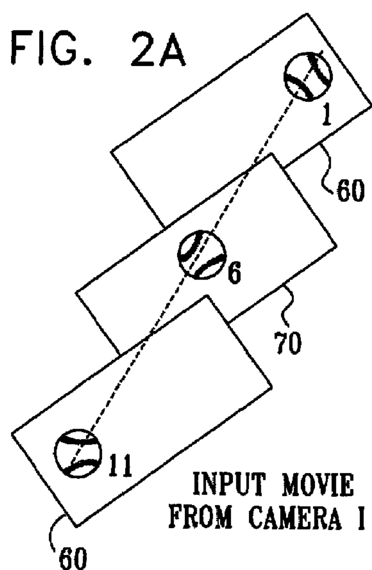
FIG. 2A is a simplified pictorial illustration of a first input movie, from a first one of the cameras of FIG. 1, of the ball throwing event of FIG. 1.
Figure 2B:
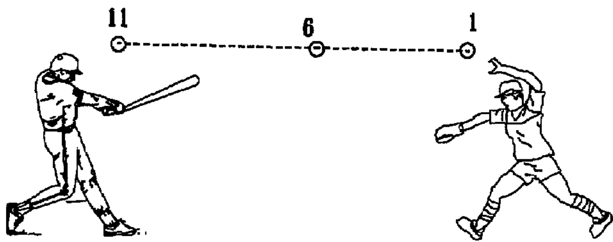
FIG. 2B is a simplified pictorial illustration of the perceived trajectory of the ball based on the first input movie of FIG. 2A.

FIG. 2A is a simplified pictorial illustration of a first input movie, from a first one of the cameras of FIG. 1, of the ball throwing event of FIG. 1. FIG. 2B is a simplified pictorial illustration of the perceived trajectory of the ball based on the first input movie of FIG. 2A.

Figure 3A:
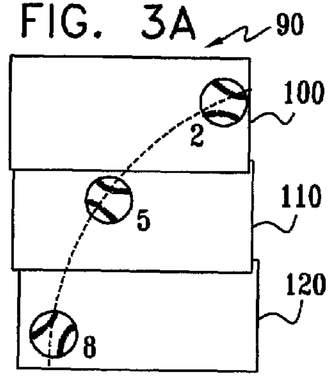
FIG. 3A is a simplified pictorial illustration of a second input movie, from a second one of the cameras of FIG. 1, of the ball throwing event of FIG. 1.
Figure 3B:
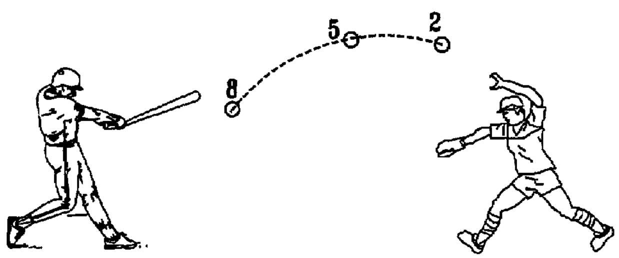
FIG. 3B is a simplified pictorial illustration of the perceived trajectory of the ball based on the second input movie of FIG. 3A.

FIG. 3A is a simplified pictorial illustration of a second input movie, from a second one of the cameras of FIG. 1, of the ball throwing event of FIG. 1. FIG. 3B is a simplified pictorial illustration of the perceived trajectory of the ball based on the second input movie of FIG. 3A.

Figure 4A:
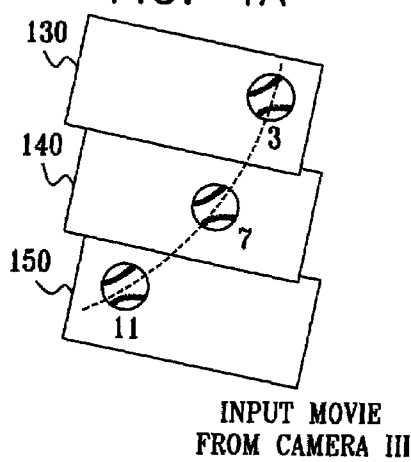
FIG. 4A is a simplified pictorial illustration of a third input movie, from a third one of the cameras of FIG. 1, of the ball throwing event of FIG. 1.
Figure 4B:
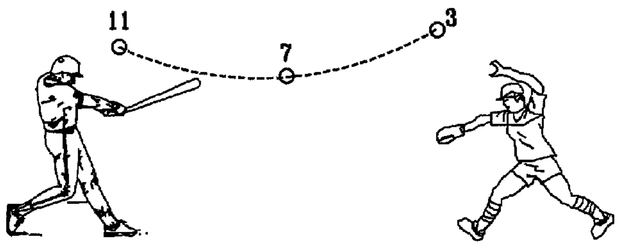
FIG. 4B is a simplified pictorial illustration of the perceived trajectory of the ball based on the third input movie of FIG. 4A.

FIG. 4A is a simplified pictorial illustration of a third input movie, from a third one of the cameras of FIG. 1, of the ball throwing event of FIG. 1. FIG. 4B is a simplified pictorial illustration of the perceived trajectory of the ball based on the third input movie of FIG. 4A.

Figure 5:
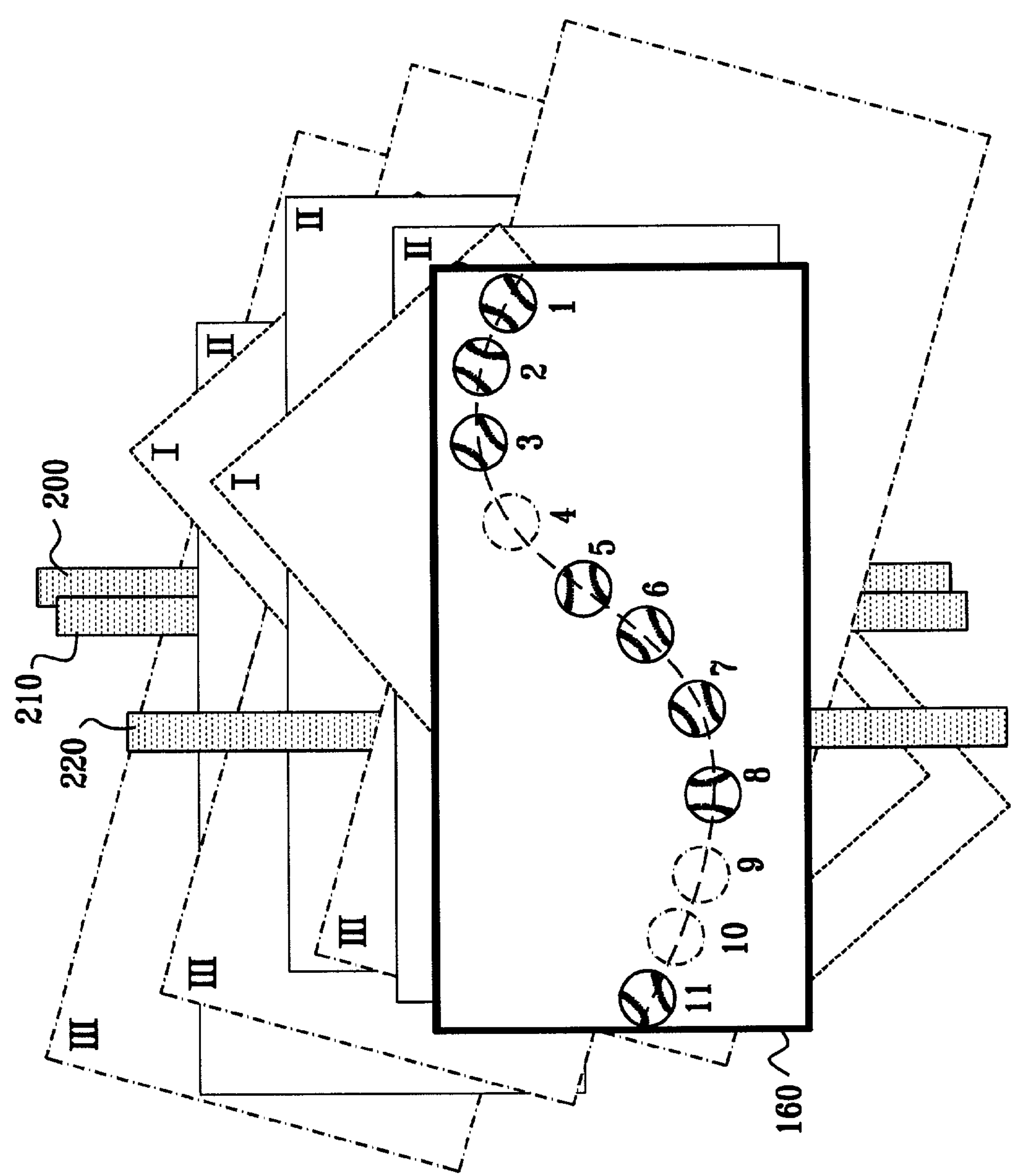
FIG. 5 is a simplified pictorial illustration of the aligned frames which, taken together, form the combined sequence of frames, with higher sampling density, shown in FIG. 1.

FIG. 5 is a simplified pictorial illustration of the aligned frames which, taken together, form the combined sequence of frames with improved temporal resolution. The markers 200, 210 and 220 are virtual and correspond to ball positions 4, 9 and 10 respectively which were not captured by any of the 3 cameras shown in FIG. 1.

Figure 6:
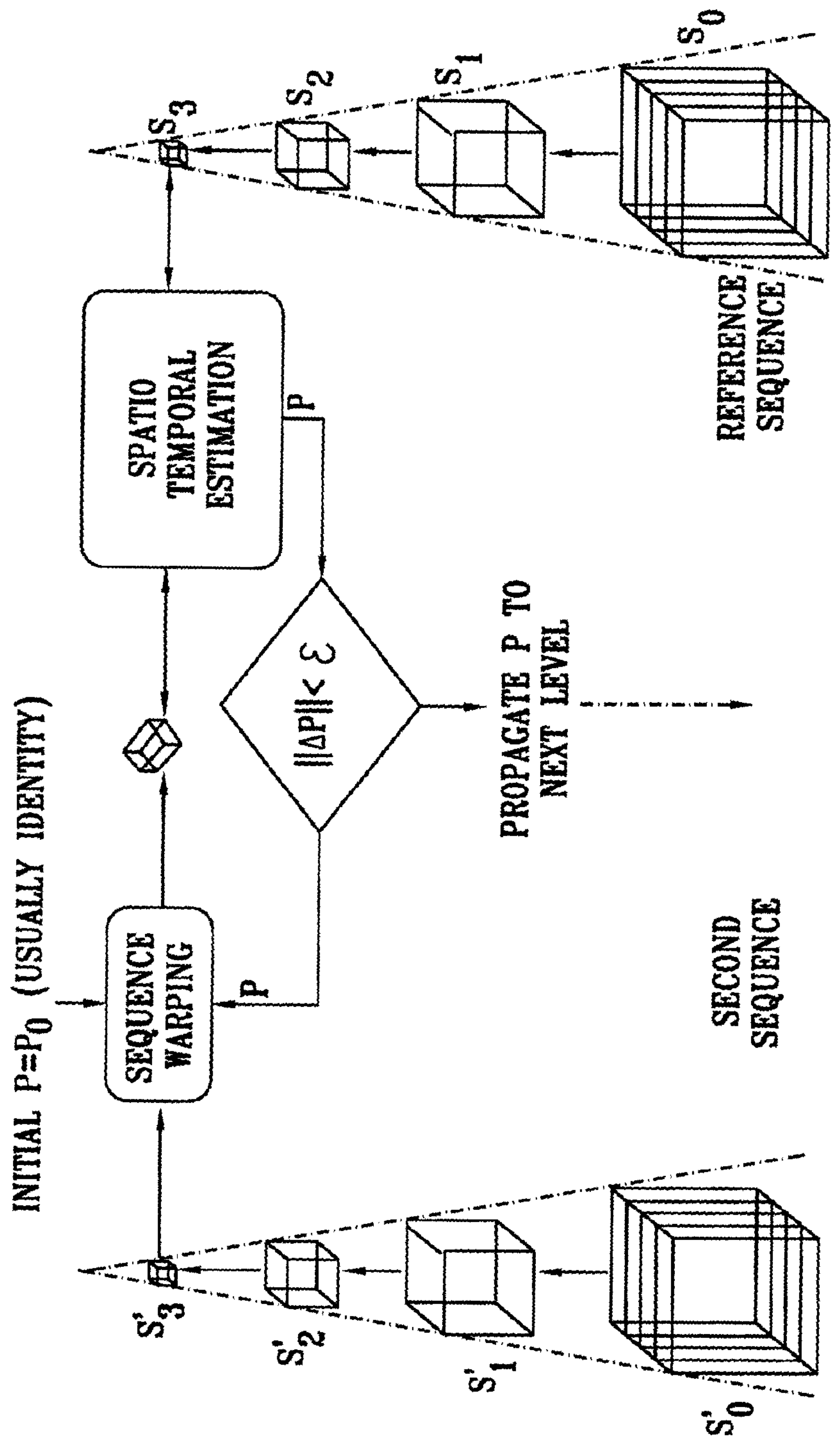
FIG. 6 is a diagram of a preferred method for subsampling and aligning image sequences according to a preferred embodiment of the present invention.

FIG. 6 is a diagram of a preferred method for subsampling and aligning image sequences according to a preferred embodiment of the present invention, where $S'_0$ is an original image sequence, $S'_1$ is subsampled from $S'_0$ as described herein, $S'_2$ is subsampled from $S'_1$ similarly, and so on.

FIG. 6 illustrates a preferred hierarchical spatio-temporal alignment framework. A volumetric pyramid is constructed for each input sequence, one for the reference sequence (on the right side), and one for the second sequence (on the left side). The spatio-temporal alignment estimator is applied iteratively at each level. It refines the approximation based on the residual misalignment between the reference volume and warped version of the second volume (drawn as a skewed cube). The output of the current level is propagated to the next level to be used as an initial estimate.

FIGS. 7A–7E illustrate spatial ambiguities in image-to-image alignment FIGS. 7A–7B show two corresponding frames from the two sequences. There are infinitely many valid image-to-image alignments between the two frames, some of them shown in FIG. 7C. FIGS. 7D–7E display two sequences of a moving ball. Only one of them aligns the two trajectories of the ball.

FIGS. 8A–8D illustrate spatio-temporal ambiguity in alignment when using only temporal information. A small airplane is crossing a scene viewed by two cameras. The airplane trajectory does not suffice to uniquely determine the alignment parameters. Arbitrary time shifts can be compensated by appropriate spatial translation along the airplane motion direction. Sequence-to-sequence alignment, on the other hand, can uniquely resolve this ambiguity, as it uses both the scene dynamics (the plane at different locations), and the scene appearance (the static ground). Note that spatial information alone does not suffice in this case either.

Figure 10:
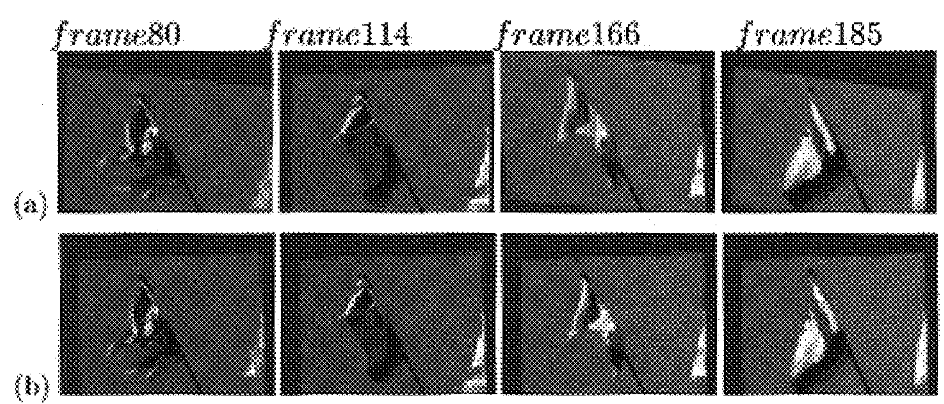
FIG. 10 is a set of color images showing the results of applying image-to-image alignment to temporally corresponding frames, compared to sequence-to-sequence alignment of the same.

FIG. 10 illustrates image-to-image alignment vs. sequence-to-sequence alignment Line 10(*a*) is a color superposition showing results of applying image-to-image alignment to temporally corresponding frames. Spatial alignment is inaccurate due to insufficient spatial information in any of these individiual frames. Line 10(*b*) is a color superposition showing accurate alignment of the same frames obtained by sequence-to-sequence alignment.

Figure 11:
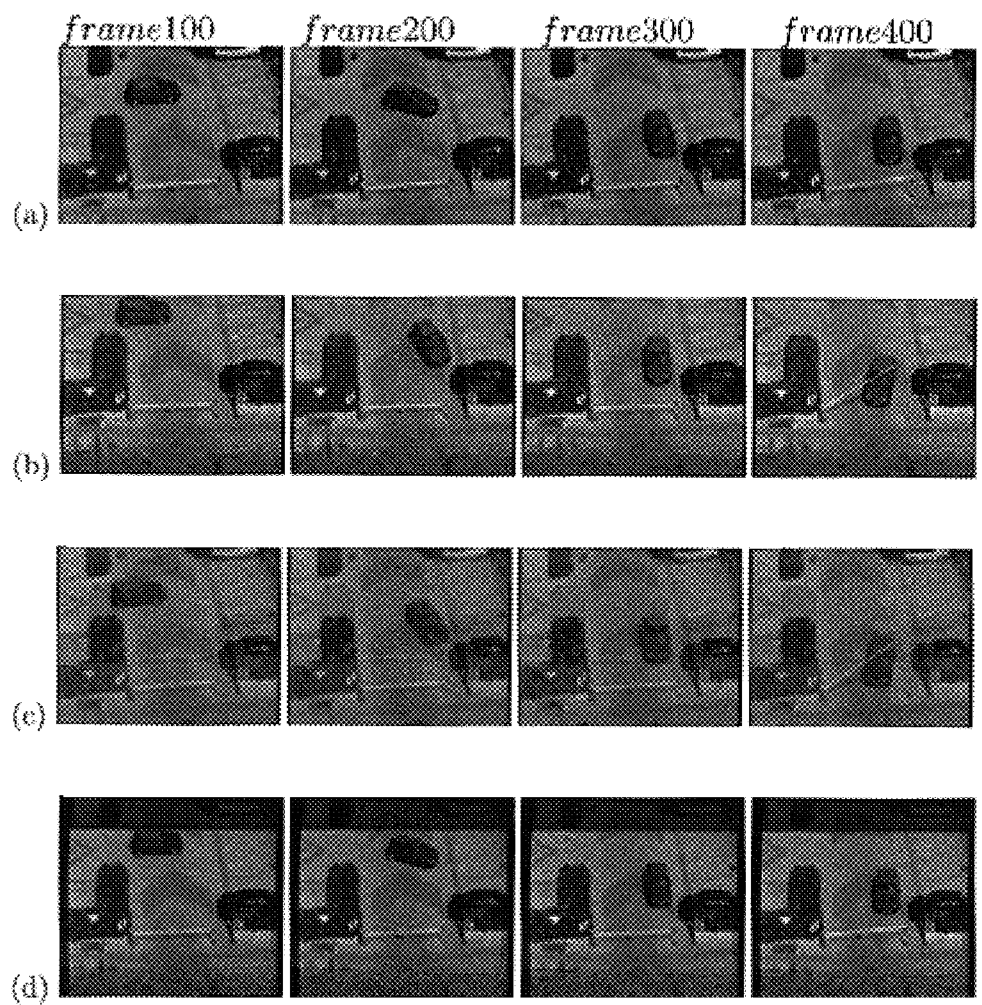
FIG. 11 illustrates sequences of color images of a moving vehicle.

FIG. 11 illustrates a scene with moving objects. Lines 11(*a*) and 11(*b*) display 4 representative frames (100,200, 300,400) from the reference and second sequences, respectively. The spatial misalignment is easily noticeable near image boundaries, where different static objects are visible in each sequence. The temporal misalignment is noticeable by comparing the position of the gate in frames 400. In the second sequence it is already open, while still closed in the reference sequence. Line 11(*c*) displays superposition of the representative frames before spatio-temporal alignment. The superposition composes the red and blue bands from reference sequence with the green band from the second sequence. Line 11(*d*) displays superposition of corresponding frames after spatio-temporal alignment. The dark pink boundaries in (d) correspond to scene regions observed only by the reference camera. The dark green boundaries in (d) correspond to scene regions observed only by the second camera.

Figure 12:
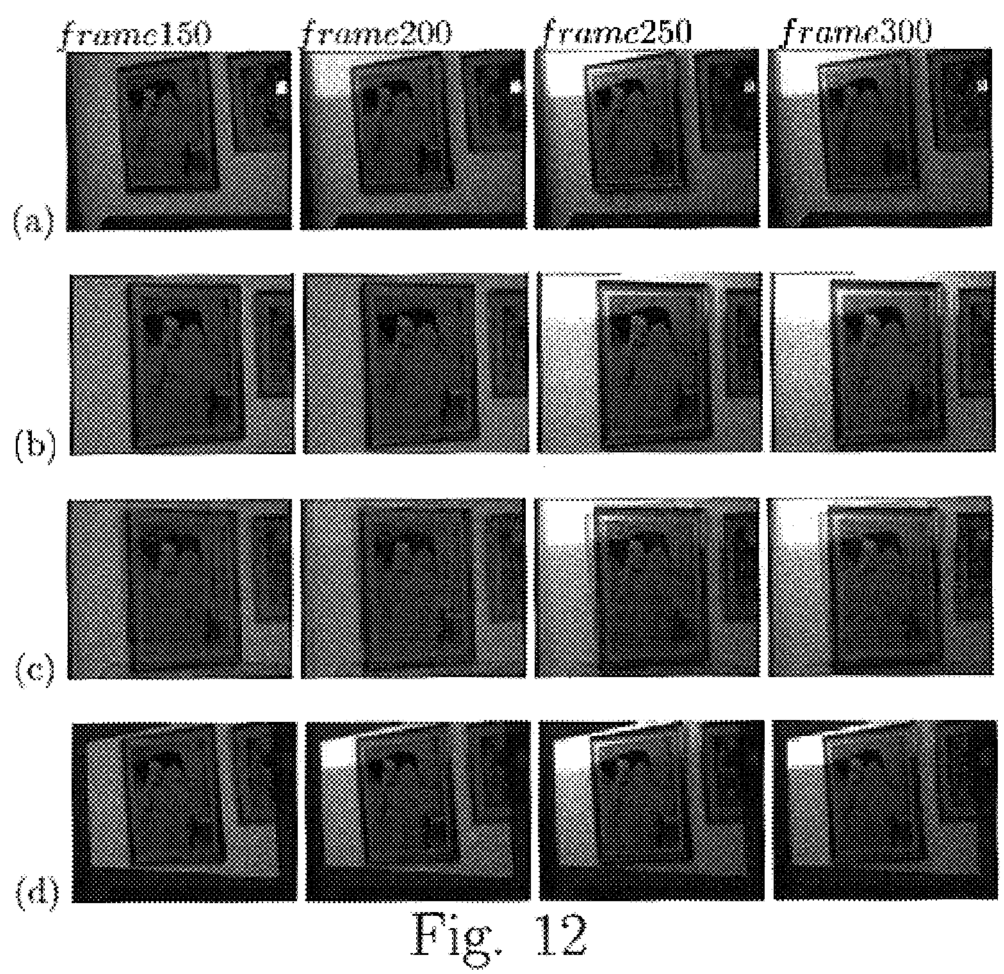
FIG. 12 illustrates sequences of color images of a scene with only varying illumination.

FIG. 12 illustrates a scene with varying illumination. Lines 12(*a*) and 12(*b*) display 4 representative frames (150,200, 250,300) from the reference and second sequences, respectively. The temporal misalignment can be observed at frames 200 and 300, by small differences in illumination in the upper-left corner of the frame. Line 12(*c*) displays superposition of the representative frames before alignment (red and blue bands from reference sequence and green band from the second sequence). Line 12(*d*) displays superposition of corresponding frames after spatio-temporal alignment. The accuracy of the temporal alignment is evident from the hue in the upper left corner of frame 200, which is pink before alignment (frame 200 of line 12(*c*)) and white after temporal alignment (frame 200 of line 12(*d*)). The dark pink boundaries in line 12(*d*) correspond to scene regions observed only by the reference camera.

Figure 13:
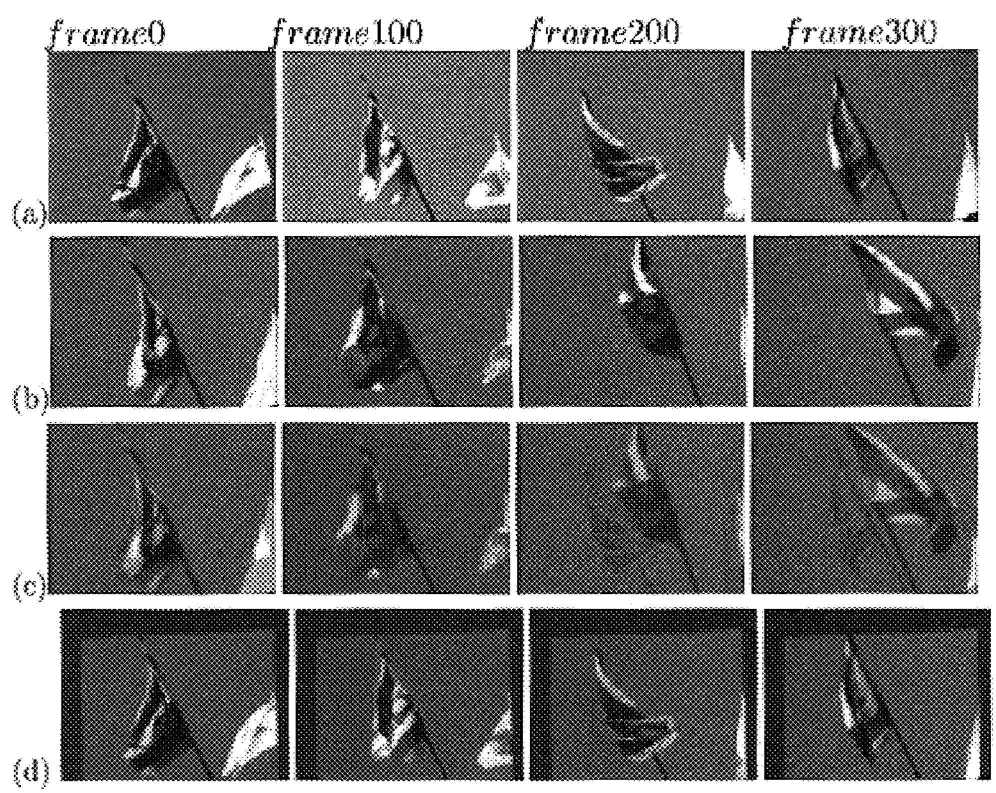
FIG. 13 illustrates sequences of color images of a scene with non-rigid motion.

FIG. 13 illustrates a scene with non-rigid motion. Lines 13(*a*) and 13(*b*) display four representative frames (0,100, 200,300) from the reference and second sequences, respectively. Line 13(*c*) displays superposition of the representative frames before spatio-temporal alignment. The spatial misalignment between the sequences is primarily due to scale differences in camera focal length (i.e., differences in scale). The temporal misalignment is most evident in frames 300 of line 13(*a*) vs. 300 of line 13(*b*), where the wind blows the flag in reversed directions. Line 13(*d*) displays superposition of corresponding frames after spatio-temporal alignment.

Figure 14:
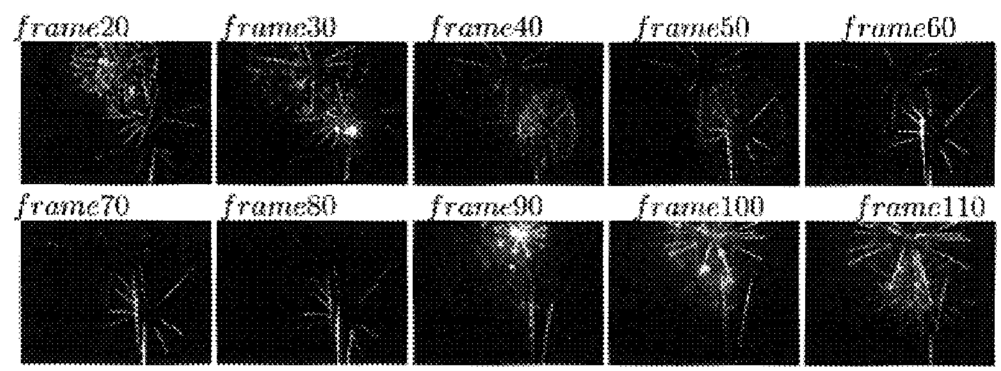
FIG. 14 illustrates a first sequence of color images of a rapidly changing scene.
Figure 15:
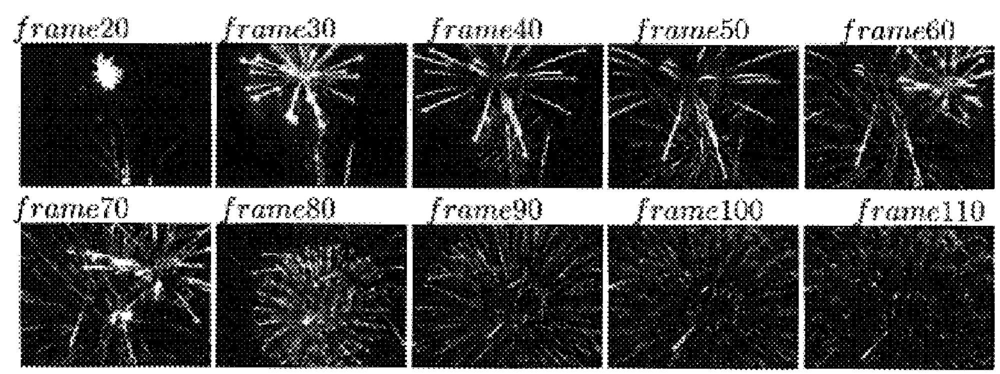
FIG. 15 illustrates a second sequence of color images of the same rapidly changing scene.
Figure 16A:
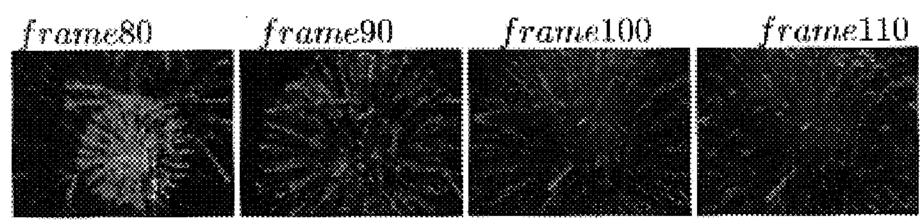
FIG. 16A illustrates a superposition of corresponding frames from FIGS. 14–15 which have not been spatio-temporally aligned.
Figure 16B:
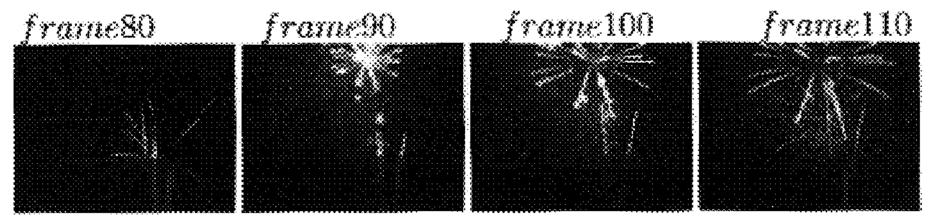
FIG. 16B illustrates a superposition of corresponding frames from FIGS. 14–15 after spatio-temporal alignment.

FIGS. 14–16 illustrate a scene which constantly changes its appearance. FIGS. 14 and 15 display 10 frames (20, 30, . . . ,110) from the reference and second sequences, respectively. It is difficult to tell the connection between the two sequences. The event in frames 90–110 in the reference sequence (FIG. 14), is the same as the event in frames 20–40 in the second sequence (FIG. 15). FIG. 16A displays superposition of the representative frames before spatio-temporal alignment. FIG. 16B displays superposition of corresponding frames after spatio-temporal alignment. Due to the scale difference there is an overlap between the two sequences only in the upper right region of every frame. Fireworks in the non-overlapping regions appear dark pink, as they were observed only by one camera. Fireworks in the overlapping regions appear white, as they should. The recovered temporal misalignment was approximately 66 frames.

A particular objective of a preferred embodiment of the present invention is to overcome the limitations of an individual imaging process by suitably combining information generated by a plurality of imaging processes which preferably differ in their imaging qualities so as to complement one another upon combination, thereby reducing the effect of the limitations of each individual imaging process.

The differences between the imaging processes which allow the imaging processes to complement one another if the imaging processes are suitably combined may include but are not limited to one of or a combination of the following: time offset, temporal and spatial resolution, spatial position and angular orientation, zoom, and physical characteristics of the image capturing devices such as aperture dimensions, focal length, exposure time and spectral response.

For example, as shown in FIG. 1, a plurality of sequences of images are received, such as three sequences 50, 90 and 120 in the illustrated embodiment, captured by different image capturing devices typically imaging the same scene 180. In the illustrated embodiment, the image capturing devices are cameras I, II and III also designated by reference numerals 20, 30 and 40 respectively. Each sequence, as shown, comprise an ordered multiplicity of images. For example, the sequence imaged by camera 20 is shown, for simplicity, to include three images 60, 70 and 80.

A particular advantage of a preferred embodiment of the invention as shown and described herein is that, as illustrated in FIG. 1, individual imaging processes, each of which have limitations, can due to those limitations represent an event so imperfectly as to be genuinely misleading. For example, as shown in FIG. 1, due to the insufficient temporal sampling employed by each of the three imaging devices 20, 30 and 40, none of the devices succeeds in correctly representing the S-shaped trajectory actually followed by the ball in the true scene 160. The first camera 20, as shown in FIGS. 2A–2B, perceives a straight-line trajectory because it images the ball only at positions 1, 6 and 11 which happen to fall roughly along a straight line. The second camera 30, as shown in FIGS. 3A–3B, perceives a banana-shaped trajectory because it images the balls only at positions 2, 5 and 8 which happen to fall roughly along a banana-shaped curve. The third camera 40, as shown in FIGS. 4A–4B, perceives an inverted banana-shaped trajectory because it images the balls only at positions 3, 7 and 11 which happen to fall roughly along an inverted banana-shaped curve.

It is appreciated that the embodiment of FIG. 1 is only one example of the applicability of the present invention. More generally, the effects of a very wide variety of imaging process limitations may be reduced by the image sequence combination methods shown and described herein. FIG. 1 pertains to compensating for the specific limitation of temporal resolution however this limitation is illustrated in FIG. 1 only by way of example.

To overcome the limitations of individual imaging processes by suitably combining information generated by a plurality of differently limited imaging processes, the image sequences generated by the various individual imaging processes are typically brought into spatial and temporal alignment as shown in FIG. 5. The three image sequences of FIG. 1 are misaligned both spatially and temporally although more generally, image sequences can also be misaligned either only spatially or only temporally.

In FIG. 5, the sequences are pictorially shown to be spatially aligned as evidenced by the three different orientations of the frames of type I, originating from camera I in FIG. 1, the frames of type II, originating from camera II, and the frames of type III, originating from camera III. As shown, the frames of type I are skewed such that their upper right hand corners have been pivoted upward, the frames of type III are skewed such that their upper left hand corners have been pivoted downward, and the frames of type II are skewed intermediately between the frames of types I and III. The particular spatial misalignment illustrated pictorially in FIG. 1 is merely illustrative and is not intended to be limiting. Computational methods for effecting the alignment shown pictorially in FIG. 5 are described in detail herein.

In FIG. 5, the sequences are pictorially shown to be temporally aligned as evidenced by the ordering of frames within the combined sequence of frames and by the three imaginary temporal spacers 200, 210 and 220 interspersed therewithin which pictorially represent the conservation of correct intervals in the combined sequence. In FIG. 1, ball positions 1–11 respectively are imaged by the following cameras: I, II, III, none, II, I, III, II, none, none, III. Therefore, the frames corresponding to these ball positions appear within the combined sequence of FIG. 5 in exactly this order. The nonuniform intervals between the frames in the combined sequence, depicted by means of imaginary temporal spaces 200, 210 and 220 in FIG. 5, occur because of missing ball positions at those temporal locations, i.e. ball positions 4, 9 and 10 which are not captured by any of the imaging processes of FIG. 1.

It is appreciated that the ball positions 1–11 in FIGS. 1–5, which are equally spaced along the temporal dimension, are illustrated only for ease of explanation, in order to pictorially represent the temporal resolutions of the component imaging processes and how these are merged. The choice of these ball positions and not others for this illustratory purpose has no significance.

According to a preferred embodiment of the present invention, each image sequence is handled as a representation or sample of a three dimensional volume of data (x,y,t) corresponding to the event as a whole, rather than merely as a collection of two-dimensional (x,y) frames. The three dimensional volume of output data (x, y, t), generated by combining several image processes and representing, typically better than any of the image processes in isolation, the entirety of an event in space and in time, is termed herein the "space-time volume" or "spatio-temporal volume" of the event. Each image sequence corresponds to a space-time volume ("the space-time volume corresponding to the image sequence") which is an incomplete and sometimes inaccurate representation of the true space-time volume representing the entirety of the event. More generally, the dimension of the space-time volume representing an event imaged by one or more n-dimensional imaging processes is n+1. To give a simple example, a circular disc which, in a given event, is moving in space along a straight line perpendicular to the disc's surface generates a cylinder in the three-dimensional (x,y,t) space-time volume representing that event. Another example is that a line which, in a given event, is translating through space generates a plane in the three-dimensional (x,y,t) space volume representing that event.

The alignment process shown and described herein preferably spatially and/or temporally aligns the spatio-temporal volumes corresponding to each of the several imaging processes capturing the event in question as shown by way of example in FIG. 5. The output of the alignment process shown and described herein is an output indication relating at least one point in a first space-time volume corresponding to a first sequence (more typically a multiplicity of points which may correspond to each and every pixel within each of a plurality of frames in that first space-time volume) to a corresponding number of points in at least a second space-time volume corresponding to a second sequence. Typically a dense correspondence between the space-time volumes of the various image sequences is generated including providing the above output for each of the sequences i.e. each sequence serves in turn as the first sequence. Preferably, subpixel, sub-frame-rate resolution alignment between image processes is obtained.

According to a preferred embodiment of the present invention, spatial-temporal misalignment between image processes capturing substantially the same event is derived from the outputs of the image processes themselves, e.g. the frames captured by the various image processes, as described in detail below. Therefore, it is typically unnecessary to receive external inputs defining the spatial misalignment or the temporal misalignment between image processes and therefore the image capturing devices need not be calibrated either individually or to one another in the spatial dimension and need not be synchronized individually or to one another in the temporal dimension. To derive misalignment between a plurality of image processes, a global alignment in time and/or space between representative portions of the space-time volumes corresponding to at least a pair of the plurality of image processes to be aligned is found by a matching or correlating process described herein in which spatial-temporal variations, or at least temporal variations, occurring within at least one of the space-time volumes are matched to spatial-temporal variations, or at least temporal variations, occurring within at least one other space-time volume.

The Sequence Brightness Error is now described with reference to the core, inner-loop step in the method of FIG. 6.

Let S, S' be two input image sequences, where S denotes the reference sequence, S' denotes the second sequence. Let (x, y, t) be a point in the space-time reference sequence S. Let u, v be its spatial displacements, and w be its temporal displacement. Denote by $\vec{P}=(\vec{P}_{spatial}, \vec{P}_{temporal})$ the unknown alignment parameter vector. While every space-time point (x, y, t) has a different local spatio-temporal displacement (u, v, w), they are all globally constrained by the parametric model $\vec{P}$.

In the current implementations $\vec{P}$ was assumed to be a parametric transformation. However, the presented framework is more general, and is not restricted to parametric transformations alone.

(u, v, w) can be equally expressed in terms of more general 3D transformations in a way similar to the hierarchy of 2D and 3D transformations proposed in direct image-to-image alignment.

In the prior art, the spatial alignment parameters were recovered directly from image brightness variations, and the coarse-to-fine estimation was done using a Gaussian image pyramid. This is generalized to recover the spatial and temporal alignment parameters directly from sequence brightness variations, and the coarse-to-fine estimation is done within a volumetric sequence pyramid. The multi-scale analysis is done both in space and in time as shown pictorially in FIG. 6.

The Sequence Brightness Error:

A global constraint on $\vec{P}$ is obtained by minimizing the following SSD objective function:

$$ERR(\vec{P}) = \sum_{x,y,t} (S'(x, y, t) - S(x-u, y-v, t-w))^2, \tag{1}$$

where: $u=u(x,y,t;\vec{P})$, $v=v(x,y,t;\vec{P})$, $w=w(x,y,t;\vec{P})$ The parameter vector $\vec{P}$ is estimated e.g. using the Gauss-Newton minimization technique. To get a term which is explicit in the unknown parameters, linearize the term in Eq. 1 with respect to the parameter vector $\vec{P}$ to obtain:

$$ERR(\vec{P}) = \sum_{x,y,t} \left[S'(x, y, t) - S(x, y, t) + \nabla S(x, y, t) J_P \vec{P}\right]^2 \tag{2}$$

where $$\nabla S = [S_x S_y S_t] = \left[\frac{\partial S}{\partial_x} \frac{\partial S}{\partial_y} \frac{\partial S}{\partial_t}\right]$$

denotes a spatio-temporal gradient of the sequence S, and $J_P$ denotes the Jacobian matrix $$J_P = \begin{bmatrix} \frac{\partial x'}{\partial P_1} & & \frac{\partial x'}{\partial P_n} \\ \frac{\partial y'}{\partial P_1} & \cdots & \frac{\partial y'}{\partial P_n} \\ \frac{\partial t'}{\partial P_1} & & \frac{\partial t'}{\partial P_n} \end{bmatrix}.$$

P is estimated by least-squares minimization. We solve the following "normal equations":

$$\sum_{x,y,t} J_P \nabla S(x, y, t)(J_P \nabla S(x, y, t))^T \vec{P} = \sum_{x,y,t} [S'(x, y, t) - S(x, y, t)] J_P \nabla S(x, y, t) \tag{3}$$

or in short notations:

$$\sum_{x,y,t} J_P \nabla S (J_P \nabla S)^T \vec{P} = \sum_{x,y,t} [S' - S] J_P \nabla S \quad (4)$$

A different linearization (with respect to (x,y,t)) is possible as well:

$$e(x,y,t;\vec{P}) = S'(x,y,t) - S(x,y,t) + [uvw]\nabla S(x,y,t,) \quad (5)$$

and $$\nabla S = [S_x S_y S_t] = \left[\frac{\partial S}{\partial_x}\frac{\partial S}{\partial_y}\frac{\partial S}{\partial_t}\right]$$

denotes a spatio-temporal gradient of the sequence S. Eq. (5) directly relates the unknown displacements (u, v, w) to measurable brightness variations within the sequence. To allow for large spatio-temporal displacements (u, v, w), the minimization of Equations (1) (3) or (5) is done within an iterative-warp coarse-to-fine framework as described herein.

In $\vec{P} = (\vec{P}_{spatial}, \vec{P}_{temporal})$ may be chosen to be a parametric transformation. Let $\vec{p} = (x, y, 1)^T$ denote the homogeneous spatial coordinates of a spatio-temporal "voxel" (x, y, t). Let H be the 3×3 matrix of the spatial parametric transformation between the two sequences. Denoting the rows of H by $[H_1, H_2,;H_3]^T$, the spatial displacement can be written as:

$$u(x, y, t) = \frac{H_1\vec{p}}{H_3\vec{p}} - x, \text{ and } v(x, y, t) = \frac{H_2\vec{p}}{H_3\vec{p}} - y.$$

Note that H is common to all frames, because the cameras are stationary. When the two cameras have different frame rates (such as with NTSC and PAL) and possibly a time shift, a 1-D affine transformation suffices to model the temporal misalignment between the two sequences: $w(t) = d_1 t + d_2$ (where $d_1$ and $d_2$ are real numbers). Two different spatio-temporal parametric alignment models are described which are not intended to be limiting:

Model 1: 2D spatial affine transformation and 1D temporal affine transformation. The spatial 2D affine model is obtained by setting the third row of H to be: H3=[0, 0, 1]. Therefore, for 2D spatial affine and 1D temporal affine transformations, the unknown parameters are:

$\vec{P} = [h_{11}\ h_{12}\ h_{13}\ h_{21}\ h_{22}\ h_{23}\ d_1\ d_2]$, i.e., eight unknowns. The individual voxel error of Eq. (5) becomes:

$$e(x,y,t;\vec{P}) = S' - S + [(H_1\vec{p} - x)(H_2\vec{p} - y)(d_1 t + d_2)]\nabla S,$$

which is linear in all unknown parameters.

Model 2: 2D spatial projective transformation and a temporal offset. In this case, w(t)=d (d is a real number, i.e., could be a sub-frame shift), and $\vec{P} = [h_{11}\ h_{12}\ h_{13}\ h_{21}\ h_{22}\ h_{23}\ h_{31}\ h_{32}$ h33 d].

Each spatio-temporal "voxel" (x, y, t) provides one constraint:

$$e(x, y, t; \vec{P}) = S' - S + \left[\left(\frac{H_1\vec{p}}{H_3\vec{p}} - x\right)\left(\frac{H_2\vec{p}}{H_3\vec{p}} - y\right)(d_1 t + d_2)\right]\nabla S, \quad (4)$$

The 2D projective transformation is not linear in the unknown parameters, and hence preferably undergoes some additional manipulation. To overcome this non-linearity, Eq. (6) is multiplied by the denominator ($H_3\vec{p}$), and renormalized with its current estimate from the last iteration, leading to a slightly different error term:

$$e_{new}(x, y, t; \vec{P}) = \frac{H_3\vec{P}}{\hat{H}_3\vec{P}} \cdot e_{old}(x, y, t; \vec{P}), \quad (5)$$

where $\hat{H}_3$ is the current estimate of $H_3$ in the iterative process, and $e_{old}$ is as defined in Eq. (6).

Let $\hat{H}$ and $\hat{d}$ be the current estimates of H and d, respectively. Substituting $H = \hat{H} + \delta H$ and $d = \hat{d} + \delta d$ into Eq. (7), and neglecting high-order terms, leads to a new error term, which is linear in all unknown parameters (δH and δd). In addition to second order terms (e.g, δH δd), the first order term $\hat{d}\delta H_3$ is also negligible and can be ignored.

In the above implementations $\vec{P}$ was assumed to be a parametric transformation. However, the presented framework is more general, and is not restricted to parametric transformations alone. (u, v, w) can be equally expressed in terms of 3D parameters (the epipole, the homography, and the shape [13, 18, 14, 10]). [1] suggests a hierarchy of possible spatial alignment models.

Spatio-Temporal Volumetric Pyramid (Optional)

The estimation step described above is embedded in an iterative-warp coarse-to-fine estimation framework. This is preferably implemented within a spatio-temporal volumetric pyramid. Multi-scale analysis provides three main benefits: (i) Larger misalignments can be handled, (ii) the convergence rate is faster, and (iii) it avoids getting trapped in local minima. These three benefits are discussed in [1] for the case of spatial alignment. Here they are extended to the temporal domain as well.

The Gaussian image pyramid [3] is generalized to a Gaussian sequence (volumetric) pyramid. Alternatively, a Laplacian pyramid can be used. The highest resolution level is defined as the input sequence. Consecutive lower resolution levels are obtained by low-pass filtering (LPF) both in space and time, followed by sub-sampling by a factor of 2 in all three dimensions x, y and t. Thus, for example, if one resolution level of the volumetric sequence pyramid contains a sequence of 64 frames of size 256×256 pixels, then the next resolution level contains a sequence of 32 frames of size 128×128, etc. [4] Preferably the minimal size of the spatio—temporal volume, at the highest level, is no less than 100 pixels×100 pixels×10 frames for projective transformations, and 50 pixels×50 pixels×5 frames for simple transformations such as translations.

Summary of the Process

Figure 9:
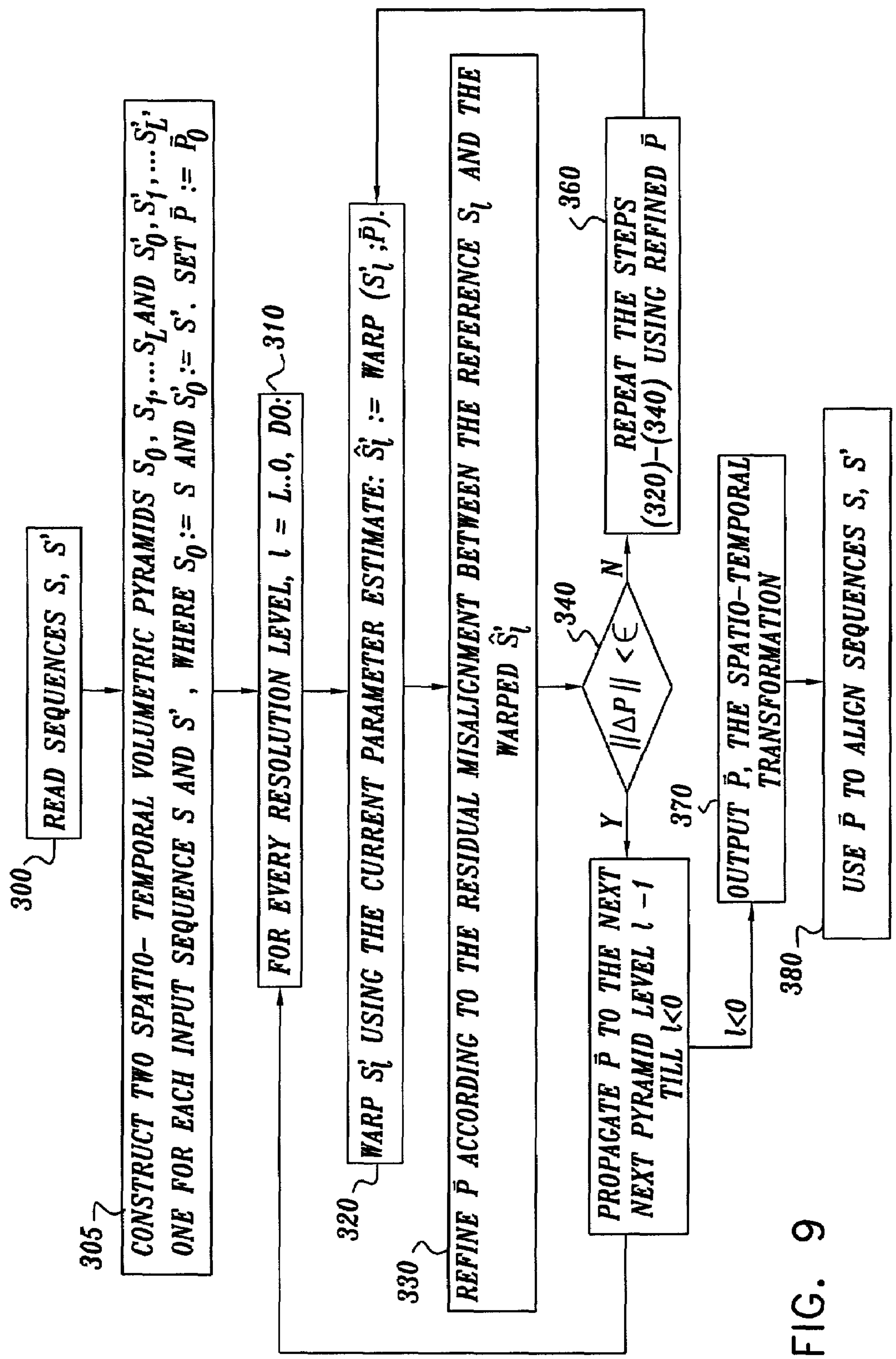
FIG. 9 is a simplified flowchart illustration of a preferred image sequence alignment method constructed and operative in accordance with a preferred embodiment of the present invention.

A preferred iterative-warp coarse-to-fine estimation process is schematically described in FIG. 9, and is summarized herein:

1. (Optional) Construct two spatio-temporal volumetric pyramids $S_0, S_1, \ldots S_L$ and $S'_0, S'_1, \ldots S'_L$, one for each input sequence S and S', where $S_0 := S$ and $S'_0 := S'$. Set $\vec{P} := \vec{P}_0$ (usually the identity transformation).
2. For every resolution level, l=L . . . 0, (or for only a single resolution level 1=0) do:
   (a) Warp $S'_1$ using the current parameter estimate: $\hat{S}\hat{}_l := \text{warp}(S'_l; \vec{P})$.

(b) Refine $\vec{P}$ according to the residual misalignment between the reference $S_l$ and the warped $\hat{S}'_l$.

(c) Repeat steps (a) and (b) until $|\Delta P|<\epsilon$.

3. (Optional) Propagate $\vec{P}$ to the next pyramid level l-1, and repeat the steps (a)-(c) for $S_{l-1}$ and $S'_{l-1}$.

The resulting $\vec{P}$ is the spatio-temporal transformation, and the resulting alignment is at sub-pixel spatial accuracy, and sub-frame temporal accuracy. Results of applying this algorithm to real image sequences are shown below.

In our experiments, two different interlaced CCD cameras (mounted on tripods) were used for sequence acquisition. No synchronization what so ever was used. Typical sequence length is several hundreds of frames. Lines (a)-(d) in FIG. 11 shows a scene with a car driving in a parking lot. The two input sequences line 11(*a*) and line 11(*b*) were taken from two different windows of a tall building. Line 11(*c*) displays superposition of representative frames, generated by mixing the red and blue bands from the reference sequence with the green band from the second sequence. This demonstrates the initial misalignment between the two sequences, both in time and in space. Note the different timing of the gate being lifted (temporal misalignment), and misalignment of static scene parts, such as the parked car or the bushes (spatial misalignment). Line 11(*d*) shows the superposition after applying spatio-temporal alignment. The second sequence was spatio-temporally warped towards the reference sequence according to the computed parameters. The recovered spatial affine transformation indicated a translation on the order of a ⅕ of the image size, a small rotation, a small scaling, and a small skew (due to different aspect ratios of the two cameras). The recovered temporal shift was 46.63 frames. Therefore, opposite fields at a distance of 46 frames were mixed together when applying the color superposition.

In FIG. 12, the sequences (a)-(d) illustrate that dynamic information cues are not restricted to independent object motion. A light source was brightened and then dimmed down, resulting in observable illumination variations in the scene. The cameras were imaging a picture on a wall from significantly different viewing angles, inducing a significant perspective distortion. Line (a) and line (b) show a few representative frames from two sequences of several hundred frames each. The effects of illumination are particularly evident in the upper left corner of the image. Note the difference in illumination in frame 200 of the two sequences—frame 200 in line 12(*a*) and frame 200 in line 12(*b*). Line 12(*c*) shows a superposition of the representative frames from both sequences before spatio-temporal alignment. Line 12(*d*) shows superposition of corresponding frames after spatio-temporal alignment. The correctness of the temporal alignment is evident from the hue in the upper left corner of frame 200, which is pink before alignment (frame 200 in line 12(*c*)) and white after temporal alignment (frame 200 in line 12(*d*)) .The accuracy of the recovered temporal offset (21.32 frames) was verified (up to 0.1 frame time) against the ground truth. The verification was implemented by imaging a small object (a tennis ball) that moves very fast. The objects were viewed by three fields only (not included in the part that was used for alignment). The tennis ball location enables us to verify manually that correct field-to field temporal corresponds. Furthermore, the phase differences of these locations (3 in each sequences) produce sub field accuracy "ground truth". We manually distinguish between 5 phases $$\left\{0, \frac{1}{5}, \frac{2}{5}, \frac{3}{5}, \frac{4}{5}\right\}$$

of field time. Therefore we can verify our results up to 0.1 frame time. This suggests that the temporal offset was a component of 0.6 of field time.

In FIG. 13 the sequences (a)-(d) illustrate a case where the dynamic changes within the sequence are due to non-rigid motion (a flag blowing in the wind). Line 13(*a*) and line 13(*b*) show two representative frames out of several hundred. Line 13(*c*) shows a superposition of the representative frames from both sequences before spatio-temporal alignment. Line 13(*d*) shows superposition of corresponding frames after spatio-temporal alignment. The recovered temporal offset was 31.43 frames. Image-to-image alignment performs poorly in this case, even when applied to temporally corresponding frames, as there is not enough spatial information in many of the individual frames. This is shown in FIG. 10. We applied image-to-image alignment to all temporally corresponding pairs of fields, (odd fields from one camera with even fields from the second camera as the computed time shift (31.4) is closer to 31.5 than the 31.0) Only 55% of corresponding frames converged to accurate spatial alignment. The other 45% suffered from noticeable spatial misalignment. A few representative frames (out of the 45% of misaligned pairs) are shown in FIG. 10, line (a). These pairs were well aligned by sequence-to-sequence alignment (FIG. 10, line (b)).

FIGS. 14-16 illustrates that temporal changes may include changes in appearance of the entire scene. The sequences show an explosion of fireworks. The fireworks change their appearance (size, shape, color and brightness) drastically throughout the sequence. FIGS. 14 and 15 show ten representative frames from two sequences of a few hundreds frames each. Frames 20-110 are displayed from the both sequences. The event in frames 90-110 in the reference sequence (FIG. 14), is the same as the event shown in frames 20-40 in the second sequence (FIG. 15). Line 16(*a*) displays superposition of four representative frames (80-110) before applying spatio-temporal alignment. The fireworks appear green and pink, due to the superposition of the different bands from different sequences (red and blue from one sequence and green from the other). The artificial colors are due to the mixture of misaligned firework with dark background from the other sequence. Line 16(*b*) displays superposition of the same five representative frames after applying spatio-temporal alignment. The fireworks are now white in the overlapping image regions, as they should be, implying good spatio-temporal alignment.

The above results were mainly qualitative. To quantify the expected accuracy of the method we applied several experiments where the exact ground truth alignment was known. First we warped a sequence using known spatio-temporal parameters, applied our method to the warped and original sequence and compared the extracted parameters with the known ones. This produced highly accurate results. Less than 0.01 frame time temporal error, and less than 0.02 pixels spatial error. The accurate results are due to the fact that the source and warped sequences are highly correlated. The only difference in corresponding "voxels" gray level is as a result of the tri-linear interpolation used when warping the second sequence. To create a test where the noise is less correlated we split a sequence into its two fields. The two field" sequences are related by known temporal and spatial parameters a temporal shift of 0.5 frame time, and temporal shift of 0.5 pixel along the Y axis. Note that in this case the data comes from the same camera, but from completely different sets of pixels (odd rows in one sequence and even rows in the other sequence). We repeated the experiment several (10) times using different sequences and different spatial models (affine, projective). In all cases the temporal error was smaller than 0.02 frame time. (i.e., the recovered time shift was between 0.48 and 0.52). The recovery in the Y-translation was smaller than 0.03 pixel (i.e., the recovered Y-shift was between 0.47 and 0.53 pixel) and the overall Euclidean error over the image was bounded by 0.1 pixels. To include error that results from using two cameras, we applied this test to pairs of sequences from different cameras.

Each sequence was split into two sequences of odd and even fields. In this case the ground truth is not given but the relative change is known. That is if the time shift between odd sequences from the first camera reference cameras is $\delta t$ then the time shift between odd sequences from the first camera and even sequences from the reference camera should be $\delta t+0.5$, and the same holds for spatial alignment. This also was performed several times and in all cases the temporal error was bounded by 0.05 frame time and the spatial error was bounded by 0.1 pixel.

In the embodiment shown and described herein, for simplicity, the internal and external parameters of the cameras are assumed to be fixed. This is not necessarily the case. For example, if the camera rotates but does not translate, each camera is independently aligned to a fixed coordinate system as in mosaic based applications which are described in the following publication: [27] Subsequently, the method shown and described herein which is suited to fixed parameter cameras, can be applied. Furthermore, the method shown and described herein can also be used for applications in which at least part of each image sequence can be aligned to a single coordinate system.

The feature-based alignment shown and described herein is also suitable for computing fundamental matrices.

The code stored on the CD-ROM appended herewith is particularly suited for handling of 2D parametric transformations however the method described herein is more general and is applicable not only to 2D transformations but also to 3D transformations. The transformations to which the present invention is applicable includes but is not limited to the following transformations: the hierarchy of transformations described in the above-referenced publication by Bergen et al, transformations expressed in terms of 3D parameters including epipole, homography and shape parameterization as described in [5], and transformations expressed in terms of plain+parallax parameterization as described in the above-referenced publications by Irani and Anandan, 1996; Kuman et al, 1994; Harpreet Sawhney 1994; and Szeliski and Shum, 1997.

The error function shown herein, obtained by minimizing an SSD objective function, is merely an example and is not intended to be limiting. Alternatively, any suitable conventional similarity measures known for use in image to image alignment, such as but not limited to normalized correlation measures, described in [28] or mutual information measures, described in [29] may be employed.

It is appreciated that the use of a Gaussian pyramid is not essential. Alternatively, for example, Laplacian pyramids or directional derivatives may be employed.

Sequence to sequence alignment may also be used in other applications which involve combining information. For example, several cameras may be imaging a sports event simultaneously from different angles. An occurrence, such as a goal, may be marked manually otherwise detected in one of the sequences and, by sequence-to-sequence alignment, identified also in all of the other sequences Alignment is also useful in applications which involve recognition of a particular event or object within a plurality of sequences. For example, in commercial advertising applications, it is sometimes desired to identify an event, such as a moving logo. The similarity measure shown and described herein may be used to facilitate this recognition task.

The CD-ROM appended herewith comprises a preferred software embodiment of the present invention. The CD-ROM has two directories: "method" and "movie". "Method" stores a hex file which can be used to create two programs whose file names are "subsamplemovie" and "matchmovies" respectively. To create the programs, do as follows:

1) Provide a Silicon Graphics computer model SGI O2 (R5000) with an IRIX 6.3 operating system.
2) Copy the file Seq2seq.hex in the \method folder stored in the appended CD-ROM into a temporary directory.
3) Unhex the computer listing Seq2seq.hex mentioned in step 2 using HEX IT V1.8 or greater by John Augustine, 3129 Earl St., Laureldale, Pa. 19605 creating file Seq2seq.zip.
4) Decompress the file Seq2seq.zip using gunzip version 1.2.4 available at www.gzip.org from gzip organization, extracting all files into a temporary directory.
5) Compile the source code stored in the temporary directory created in step 4 using a C++ compiler version 7.1 using the file "makefile". The resulting two applications will be created:
   a) SubsampleMovie
   b) MatchMovies The inputs to these programs are suitably formatted movies. Two examples of suitably formatted movies can be created as follows:

1) Copy the file Movie.hex in the \movie folder stored in the appended CD-ROM into a temporary directory.
2) Unhex the computer listing movie.hex mentioned in step 6 using HEX IT V1.8 or greater by John Augustine, 3129 Earl St., Laureldale, Pa. 19605 creating file movie.zip.
3) Decompress the file movie.zip using gunzip version 1.2.4 or greater, extracting all files into a temporary directory.
4) The files located in the temporary directory, namely:
   a) left_cam_gray_movie.g
   b) right_cam_gray_movie.g, or any similarly formatted movies, can serve as input movies.

The "subsamplemovie" program is a software implementation of a preferred movie subsampling procedure. The "matchmovies" program is a software implementation of a preferred procedure for aligning movies. A preferred method for running these programs to obtain an alignment in accordance with a preferred embodiment of the present invention is as follows:

a. Run "subsamplemovie" on a first input movie to be aligned to a second input movie. A suitable format for the input movies is exemplified by the example movies in the Movies directory, stored on the CD-ROM appended herewith.

The command may be: subsampleMovie-m movie_name, where movie_name is the name of the first input movie. The output of this process is termed herein "the first level subsample of the first input movie".

b. Run "subsamplemovie" on the first level subsample of the first input movie. The output of this process is termed herein "the second level subsample of the first input movie".
c. Run "subsamplemovie" on the second level subsample of the first input movie. The output of this process is termed herein “the third level subsample of the first input movie”. For the purposes of illustration, three levels of subsampling are described herein although the number of levels of subsampling depends on image size, application and other situational parameters and may, for example, be 4 or 5.

d. Run “subsamplemovie” as in steps (a) to (c) using the second input movie in order to generate first, second and third level subsamples of the second input movie.

e. Run “matchmovies” on the third level subsamples of the first and second input movies. The command may be:

matchMovies<gm1_3><gm2_3><type>, where gm1_3 and gm2_3 are the file names identifying the third level subsamples of the first and second input movies respectively.

“Type” is the type of transformation which is desired, e.g. translation (t), affine (a), quadratic (q) or projective (p).

The output of this process is termed herein P and comprises a spatial component (transformation) and a temporal component (timeshift) of the recovered alignment between the two input sequences to the process.

f. Run “matchmovies” on the second level subsamples of the first and second input movies. The command may be:

matchMovies <gm1_2><gm2_2><type><2deltat><stfn>.

where:

gm1_2 and gm2_2 are the file names identifying the second level subsamples of the first and second input movies respectively, type is t or a or q or p as described above, 2deltat is twice the temporal component of the output of step (e), and stfn is the spatial transformation file name, i.e. the file name of the scaled spatial transformation component of the output of step (e). A suitable scaling comprises doubling the translation component of the spatial component of the output of step (e) and halving the projective component of the spatial component of the output of step (e).

g. Run “matchmovies” on the first level subsamples of the first and second input movies. The command may be:

matchMovies <gm1_1><gm2_1><type><2deltat><stfn>.

where:

gm1_1 and gm2_1 are the file names identifying the first level subsamples of the first and second input movies respectively, type is t or a or q or p as described above, 2deltat is twice the temporal component of the output of step (f), and stfn is the spatial transformation file name, i.e. the file name of the scaled spatial transformation component of the output of step (f). A suitable scaling comprises doubling the translation component of the spatial component of the output of step (f) and halving the projective component of the spatial component of the output of step (f).

h. Run “matchmovies” on the original first and second input movies.

The command may be:

matchMovies <gm1><gm2><type><2deltat><stfn>.

where:

gm1 and gm2 are the file names identifying the first and second input movies respectively, type is t or a or q or p as described above, 2deltat is twice the temporal component of the output of step (g), and stfn is the spatial transformation file name, i.e. the file name of the scaled spatial transformation component of the output of step (g). A suitable scaling comprises doubling the translation component of the spatial component of the output of step (g) and halving the projective component of the spatial component of the output of step (g).

The output of step (h) is the alignment of the two input movies.

For sequences (movies) which are relatively well aligned, use of the movie subsampling program may be omitted.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

It is appreciated that the software components of the present invention may, if desired, be implemented in ROM (read-only memory) form. The software components may, generally, be implemented in hardware, if desired, using conventional techniques.

It is appreciated that the particular embodiment described in the Appendix is intended only to provide an extremely detailed disclosure of the present invention and is not intended to be limiting.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited to what has been particularly shown and described hereinabove. Rather, the scope of the present invention is defined only by the claims that follow:

The invention claimed is:

1. A method for aligning in at least one of time and space temporally ordered sequences of images comprising:

receiving a plurality of sequences of images, each sequence containing a multiplicity of images, each of said plurality of sequences defining a space-time volume, without requiring that images in said plurality of sequences be coincident in time;

providing an output indication relating at least one point in a space-time volume corresponding to one of said plurality of sequences to at least one point in a space-time volume corresponding to at least another one of said plurality of sequences thereby aligning said temporally orderes sequences of images.

2. A method for aligning according to claim 1 and wherein said providing an output indication comprises:

finding at least one global alignment in at least one of time and space between at least a portion of a first space-time volume corresponding to one of said plurality of sequences and at least a portion of a second space-time volume corresponding to at least another one of said plurality of sequences, which said at least one global alignment matches spatial-temporal variations occurring at plural locations in said first space-time volume to spatial-temporal variations occurring at plural locations in said second space-time volume.

3. A method for aligning according to claim 2 and wherein said finding performs correlation.

4. A method according to claim 2 wherein said step of finding at least one global alignment in at least one of time and space comprises finding at least one global alignment in time.

5. A method according to claim 2 wherein said step of finding at least one global alignment in at least one of time and space comprises finding at least one global alignment in space.

6. A method for aligning according to claim 1 and wherein said providing an output indication comprises:

finding at least one global alignment in at least one of time and space between at least a portion of a first space-time volume corresponding to one of said plurality of sequences and at least a portion of a second space-time volume corresponding to at least another one of said plurality of sequences, which said at least one global alignment matches at least temporal variations occurring at plural locations in said first space-time volume to at least temporal variations occurring at plural locations in said second space-time volume.

7. A method for aligning according to claim 6 and wherein said finding performs correlation.

8. A method according to claim 7 and wherein said temporal variations result from at least one of said sequences being at different frame rates, said sequence having a time shift therebetween and said sequences having a shift at sub-frame units.

9. A method according to claim 6 and wherein said temporal variations result from at least one of said sequences being at different frame rates, said sequence having a time shift therebetween and said sequences having a shift at sub-frame units.

10. A method according to claim 1 wherein said images comprise color images.

11. A method according to claim 1 and wherein said at least one point in a space-time volume comprises at least one of a point in a sub-frame unit and a point in a sub-pixel unit.

12. A system for aligning in at least one of time and space temporally ordered sequences of images comprising:

a space-time volume generator, receiving a plurality of sequences of images, each sequence containing a multiplicity of images, each of said plurality of sequences defining a space-time volume; without requiring that images in said plurality of sequences be coincident in time; and an aligner to align said temporally ordered sequences of images by providing an output indication relating at least one point in a space-time volume corresponding to one of said plurality of sequences to at least one point in a space-time volume corresponding to at least another one of said plurality of sequences.

13. A system for aligning according to claim 12 and wherein said aligner comprises a match-based global alignment finder, finding at least one global alignment in at least one of time and space between at least a portion of a first space-time volume corresponding to one of said plurality of sequences and at least a portion of a second space-time volume corresponding to at least another one of said plurality of sequences, which said at least one global alignment matches spatial-temporal variations occurring at plural locations in said first space-time volume to spatial-temporal variations occurring at plural locations in said second space-time volume.

14. A system for aligning according to claim 13 and wherein said match-based global alignment finder comprises a correlation based finder.

15. A system for aligning according to claim 12 and wherein said aligner comprises a match-based global alignment finder, finding at least one global alignment in at least one of time and space between at least a portion of a first space-time volume corresponding to one of said plurality of sequences and at least a portion of a second space-time volume corresponding to at least another one of said plurality of sequences, which said at least one global alignment matches at least temporal variations occurring at plural locations in said first space-time volume to spatial-temporal variations occurring at plural locations in said second space-time volume.

16. A system for aligning according to claim 15 and wherein said match-based global alignment finder comprises a correlation based finder.

17. A system for aligning according to claim 16 and wherein said temporal variations result from at least one of said sequences being at different frame rates, said sequences having a time shift therebetween and said sequences having a shift at sub-frame units.

18. A system for aligning according to claim 15 and wherein said temporal variations result from at least one of said sequences being at different frame rates, said sequences having a time shift therebetween and said sequences having a shift at sub-frame units.

19. A system for aligning according to claim 12 and wherein said at least one point in a space-time volume comprises at least one of a point in a sub-frame unit and a point in a sub-pixel unit.

* * * * *

UNITED STATES PATENT AND TRADEMARK OFFICE

CERTIFICATE OF CORRECTION

PATENT NO. : 7,428,345 B2 Page 1 of 1
APPLICATION NO. : 09/852891
DATED : September 23, 2008
INVENTOR(S) : Yaron Caspi et al.

It is certified that error appears in the above-identified patent and that said Letters Patent is hereby corrected as shown below:

In column 15, line 62, please replace the equation number "(4)" with --(6)--.

In column 16, line 8, please replace

" $\frac{H_3\vec{P}}{\hat{H}_3\vec{P}}$ " with -- $\frac{H_3\vec{p}}{\hat{H}_3\vec{p}}$ -- (i.e. the letter p should be lower case).

In column 16, line 8, please replace the equation number "(5)" with --(7)--.

Signed and Sealed this

Twentieth Day of January, 2009

JON W. DUDAS
*Director of the United States Patent and Trademark Office*